(12) United States Patent (10) Patent No.: US 7,673,477 B2
Shirako et al. (45) Date of Patent: Mar. 9, 2010

(54) OPTICAL FIBER PROCESSING APPARATUS

(75) Inventors: Yukinari Shirako, Chiba (JP); Masaru Itoh, Chiba (JP); Hiroyuki Sawano, Chiba (JP); Takahiro Hamada, Chiba (JP)

(73) Assignee: Fujikura Ltd., Tokyo (JP)

( * ) Notice: Subject to any disclaimer, the term of this patent is extended or adjusted under 35 U.S.C. 154(b) by 1151 days.

(21) Appl. No.: 11/094,305

(22) Filed: Mar. 31, 2005

(65) Prior Publication Data
US 2005/0262878 A1 Dec. 1, 2005

(30) Foreign Application Priority Data
Apr. 15, 2004 (JP) ............................ P2004-120252
Apr. 15, 2004 (JP) ............................ P2004-120253

(51) Int. Cl.
*C03B 37/01* (2006.01)
(52) U.S. Cl. ....................................... 65/426
(58) Field of Classification Search ................... 65/424, 65/426, 530
See application file for complete search history.

(56) References Cited

U.S. PATENT DOCUMENTS 6,328,801 B1 * 12/2001 Gary et al. ................... 118/688
2002/0073741 A1 6/2002 Ishida
2003/0084684 A1 5/2003 Zhang
2004/0139766 A1 7/2004 Weeks et al.

FOREIGN PATENT DOCUMENTS

| JP | 08-012363 A | 1/1996 |
|---|---|---|
| JP | 2002-187733 A | 7/2002 |
| JP | 2002-214454 A | 7/2002 |
| JP | 3379074 B2 | 12/2002 |
| JP | 3393120 B2 | 1/2003 |
| JP | 2003-137580 A | 5/2003 |
| JP | 2003-335545 A | 11/2003 |
| WO | WO 2005/003051 | 1/2005 |

* cited by examiner

*Primary Examiner*—Steven P Griffin
*Assistant Examiner*—Queenie Dehghan
(74) *Attorney, Agent, or Firm*—Sughrue Mion, PLLC

(57) ABSTRACT

An optical fiber processing apparatus comprises reactors (3, 3*a*, 3*b* and 3*c*) that accommodate optical fiber, a single suction pump (7) having an intake port (19) and an outlet port (21), a storage chamber (5) into which deuterium containing gas is delivered, and a circuit portion (9, 59) including a plurality of valves disposed on a plurality of passages connecting the reactors, the suction pump and the storage chamber. The circuit portion includes a first channel for returning deuterium containing gas inside a reactor chamber to the storage chamber, a second channel for delivering air to the reactor chamber thereby rendering the pressure inside the reactor chamber atmospheric pressure, a third channel for decompression of the reactor chamber and a fourth channel for supplying deuterium containing gas in the storage chamber into the reactor chamber.

6 Claims, 21 Drawing Sheets

OPTICAL FIBER PROCESSING APPARATUS

CROSS REFERENCE TO RELATED APPLICATIONS

This application is based upon and claims the benefit of priority from Japanese Patent Application No. 2004-120252 and Japanese Patent Application No. 2004-120253 both filed on Apr. 15, 2004, the entire contents of which are incorporated by reference herein.

BACKGROUND OF THE INVENTION

1. Field of the Invention

The present invention is related to an optical fiber processing apparatus for controlling transmission loss.

2. Description of Related Art

Generally, optical fiber is produced by stretching quartz glass based material when the material is in a melted state heated to a high-temperature of approximately 2000° C. After the stretched fiber core is rapidly cooled inside a cooling device such as a cooling cylinder or the like, the fiber core is coated, wrapped with a coating resin. It is known that during this series of steps, NBOHC (Non-Bridging Oxygen Hole Center Si—O) arises when the melted fiber core is rapidly cooled.

The NBOHC remaining in the optical fiber combines with hydrogen remaining in the optical fiber during the production process or hydrogen arising from the resinous coating the optical fiber, becoming Si—OH. If the hydroxyl (—OH) arises, optical loss in the 1.38 micrometer optical communication wavelength increases due to absorption loss from the hydroxyl, resulting in a deterioration in the transmission characteristics of the optical fiber.

The method of exposing the optical fiber to gas containing deuterium is known for use to improve the problem of deteriorating transmission characteristics. This well-known method involves reacting the NBOHC inside the quartz glass with deuterium (D2) and generating deuteroxyl (—OD) instead of hydroxyl (—OH). Because the optical absorption band of deuteroxy is 1.87 micrometers, wavelength region where absorption loss is substantial is shifted beyond the optical communication wavelength region of the 1.3 micrometer, thereby reducing transmission loss of the optical communication wavelength region. However, a problem affecting this well-known method is that the duration of exposure to the deuterium containing gas must continue for a day or a week, this substantial time requirement rendering the method inefficient.

Accordingly, a method in which a reactor chamber filled with gas containing deuterium is used as a decompression chamber in order to reduce time of exposure to the deuterium containing gas, while using a storage chamber that enables the valuable deuterium to be reused instead of being discarded has been proposed in Japanese Patent Application No. 2003-424632.

However, the above method which employs a decompression reactor and a storage chamber requires a plurality of pumps such as a pump in order to facilitate decompression in the reactor, a pump in order to supply the deuterium containing gas inside the storage chamber to the reactor after decompression is complete and a pump to return the deuterium containing gas to the storage chamber after that operation. Accordingly, the problem arises of considerable expense required for equipment costs.

Further, the storage chamber is a supply container for supplying the deuterium containing gas to the inside of the reactor and therefore there must be a one-to-one pairing relationship between the reactor and the storage chamber. This means that in order to process a plurality of optical fibers simultaneously, a plurality of reactors are required for setting the optical fiber which then requires the same number of storage chambers to be provided as the number of reactors. This requires usage of substantial space to install the equipment and engenders considerable expense for equipment costs.

Here, a method in which a single large storage chamber or a highly pressurized storage chamber is employed to correspond to a plurality of reactors is conceivable. However, increasing the size of the storage chamber raises costs, while in providing a high-pressure container, substantial back pressure arises from the vacuum pump and it is not possible to create a sufficient vacuum condition in the reactor.

SUMMARY OF THE INVENTION

The present invention was devised to solve the above problems, an object of the present invention being to provide an optical fiber processing apparatus for exposing an optical fiber to a deuterium containing gas, in which the processing operations of the optical fiber processing apparatus are performed using a single pump, for a single reactor chamber and a single storage chamber.

It is a further object of the invention is to provide an optical fiber processing apparatus for exposing an optical fiber to the deuterium containing gas, in which a plurality of reactors can be used to correspond to a single storage chamber.

In order to realize the above objectives, according to a first aspect of the present invention, an optical fiber processing apparatus is provided comprising:

a reactor chamber that accommodates an optical fiber;

a suction pump having an intake port and an outlet port;

a storage chamber into which deuterium containing gas is delivered; and a circuit portion including a plurality of open/close valves over a plurality of paths that connect said reactor chamber, said suction pump and said storage chamber, said circuit portion further including:

a first channel that opens through performance of a first valve operation that, after completion of processing, takes in deuterium containing gas inside said reactor chamber from said intake port of said suction pump, and expels out said deuterium containing gas from said outlet port of said suction pump, returning said deuterium containing gas to said storage chamber;

a second channel that opens through performance of a second valve operation that delivers air into said reactor chamber making the pressure inside said reactor chamber atmospheric pressure;

a third channel that opens through performance of a third valve operation, that takes in air inside said reactor chamber from said intake port of said suction pump and expels out said air from said outlet port of said suction pump into the atmosphere, decompressing the pressure inside said reactor chamber; and a fourth channel that opens through performance of a fourth valve operation, that takes in deuterium containing gas inside said storage chamber from said intake port of said suction pump and expels out said deuterium containing gas from said outlet port of said suction pump, supplying said deuterium containing gas to said reactor chamber.

According to another aspect of the present invention, an optical fiber processing apparatus for exposing an optical fiber to an atmosphere of deuterium containing gas is provided, this optical fiber processing apparatus comprising a reactor chamber that can accommodate an optical fiber and can be filled with deuterium containing gas;

a suction pump having an intake port and an outlet port, that expels gas from and injects gas into said reactor chamber;

a storage chamber capable of storing said deuterium containing gas that fills said reactor chamber; and a circuit portion connecting said reactor chamber, said suction pump and said storage chamber, said circuit portion including:

a first open/close valve disposed in a passage connecting said intake port of said suction pump and said reactor chamber;

a second open/close valve disposed in a passage connecting said intake port of said suction pump and said storage chamber;

a third open/close valve disposed in a passage connecting said outlet port of said suction pump and said storage chamber;

a fourth open/close valve disposed in a passage connecting said outlet port of said suction pump and said reactor chamber;

a fifth open/close valve disposed in a passage that passes from said outlet port of said suction pump to the external atmosphere; and a sixth open/close valve disposed in a passage that passes from said reactor chamber to the external atmosphere.

According to yet another aspect of the present invention, an optical fiber processing apparatus for exposing an optical fiber to an atmosphere of deuterium containing gas is provided, this optical fiber processing apparatus comprising a reactor chamber that can accommodate an optical fiber and can be filled with deuterium containing gas;

a suction pump having an intake port and an outlet port, that expels gas from and injects gas into said reactor chamber, a storage chamber capable of storing said deuterium containing gas supplied to said reactor chamber; and a circuit portion connecting said reactor chamber, said suction pump and said storage chamber, said circuit portion including:

a first channel for returning deuterium containing gas inside said reactor chamber to said storage chamber using said suction pump, that forms an open passage through the opening of a first open/close valve disposed in a passage connecting said reactor chamber and said intake port of said suction pump and a third open/close valve disposed in a passage connecting said outlet port of said suction pump and said storage chamber;

a second channel for delivering air to said reactor chamber thereby rendering the pressure inside said reactor chamber the same as atmospheric pressure, that forms an open passage through the opening of a sixth open/close valve disposed in a passage that passes from said reactor chamber to the external atmosphere;

a third channel for expelling the air inside said reactor chamber into the atmosphere using said suction pump, thereby reducing the pressure inside said reactor chamber, that forms an open passage through the opening of said first open/close valve and a fifth open/close valve disposed in a passage passing from said outlet port of said suction pump to the atmosphere; and a fourth channel for supplying said deuterium containing gas inside said storage chamber to said reactor chamber using said suction pump, that forms an open passage through the opening of a second open/close valve disposed in a passage connecting said storage chamber and said intake port of said suction pump and a fourth open/close valve disposed in a passage connecting said outlet port of said suction pump and said reactor chamber.

According to yet another aspect of the present invention, an optical fiber processing apparatus for exposing an optical fiber to an atmosphere of deuterium containing gas is provided, this optical fiber processing apparatus comprising a plurality of reactor chambers that can accommodate an optical fiber and can be filled with deuterium containing gas;

a connection passage to which said plurality of reactors are connected in parallel;

a suction pump having an intake port and an outlet port, that expels gas from and injects gas into said plurality of reactor chambers;

a storage chamber capable of storing deuterium containing gas supplied to each of said plurality of reactor chambers; and a circuit portion connecting said suction pump, said connection passage and said storage chamber, said circuit portion including;

a first open/close valve disposed in a passage connecting said intake port of said suction pump and said connection passage;

a second open/close valve disposed in a passage connecting said intake port of said suction pump and said storage chamber;

a third open/close valve disposed in a passage connecting said outlet port of said suction pump and said storage chamber;

a fourth open/close valve disposed in a passage connecting said outlet port of said suction pump and said connection passage;

a fifth open/close valve disposed in a passage that passes from said outlet port of said suction pump to the external atmosphere; and a sixth open/close valve disposed in a passage that passes from said connection passage to the external atmosphere.

According to yet another aspect of the present invention, an optical fiber processing apparatus is provided comprising a plurality of reactor chambers filled with deuterium containing gas which accommodate optical fibers such that the optical fiber can be inserted in and removed therefrom;

a single storage chamber capable of storing deuterium containing gas; and a suction pump for delivering deuterium containing gas from said reactor chambers to said storage chamber and from said storage chamber to said reactor chambers, wherein said plurality of reactor chambers are controlled by a program of a control part such that said plurality of reactor chambers one by one enter a condition in which reactions are not occurring, moreover when a single reactor chamber has entered a condition in which reactions are not occurring the remaining reactor chambers are in a condition in which reactions are occurring, and wherein said storage chamber is used as a holding chamber for temporarily holding said deuterium containing gas inside a reactor chamber that is in a condition in which reactions are not occurring.

According to yet another aspect of the present invention, an optical fiber processing apparatus is provided wherein the capacity of said storage chamber is the same as the capacity of each said reactor chamber.

According to yet another aspect of the present invention, an optical fiber processing apparatus is provided wherein the pressure inside the reactor chamber is usually set from vacuum to atmospheric pressure.

According to yet another aspect of the present invention, an optical fiber processing method utilizing an optical fiber processing apparatus for exposing an optical fiber in an atmosphere of deuterium containing gas is provided, said optical fiber processing apparatus comprising:

a reactor chamber that can accommodate an optical fiber and can be filled with deuterium containing gas;

a suction pump having an intake port and an outlet port, that expels gas from and injects gas into said reactor chamber;

a storage chamber capable of storing said deuterium containing gas filling said reactor chamber; and a circuit portion connecting said reactor chamber, said suction pump and said storage chamber, said circuit portion having a first open/close valve disposed in a passage connecting said intake port of said suction pump and said reactor chamber, a second open/close valve disposed in a passage connecting said intake port of said suction pump and said storage chamber, a third open/close valve disposed in a passage connecting said outlet port of said suction pump and said storage chamber, a fourth open/close valve disposed in a passage connecting said outlet port of said suction pump and said reactor chamber, a fifth open/close valve disposed in a passage that passes from said outlet port of said suction pump to the external atmosphere and a sixth open/close valve disposed in a passage that passes from said reactor chamber to the external atmosphere, said optical fiber processing method comprising the steps of setting an optical fiber in said reactor chamber;

opening said first open/close valve and said fifth open/close valve and decompressing the pressure inside said reactor chamber via said suction pump;

opening said second open/close valve and said fourth open/close valve and supplying said deuterium containing gas inside said storage chamber into said reactor chamber via said suction pump;

exposing the optical fiber inside said reactor chamber to said deuterium containing gas for a predetermined time;

opening said first open/close valve and said third open/close valve and returning said deuterium containing gas inside said reactor chamber to said storage chamber via said suction pump; and opening said sixth open/close valve and delivering air into said reactor chamber thereby rendering the pressure inside that reactor chamber the same as atmospheric pressure.

BRIEF DESCRIPTION OF THE ACCOMPANYING DRAWINGS

These and other objects, features and advantages will become clearer from the following description of exemplary embodiments of the invention, read in connection with the accompanying drawings in which.

DETAILED DESCRIPTION OF THE INVENTION

Figure 1:
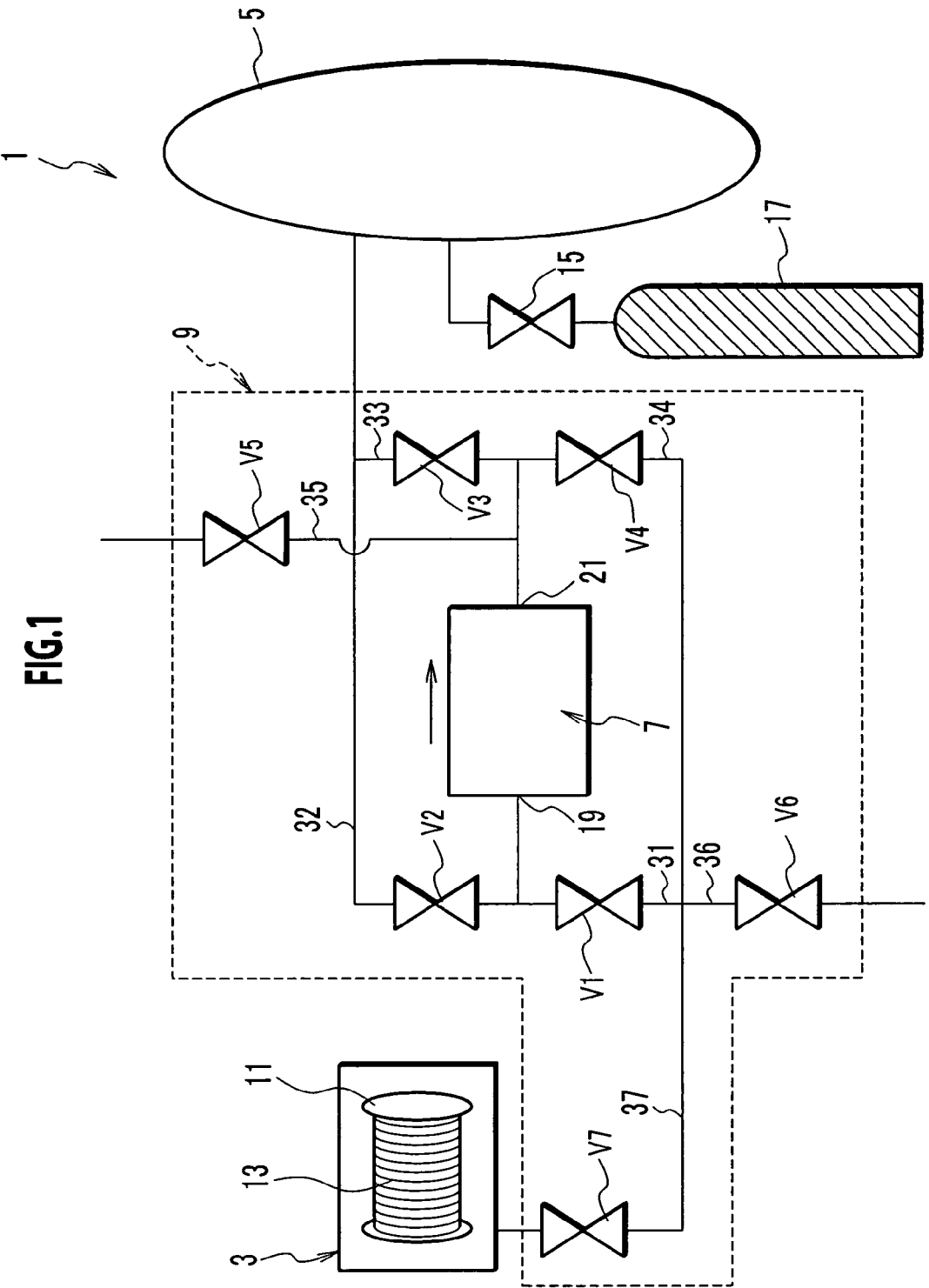
FIG. 1 is a schematic block diagram illustrating the construction of an optical fiber processing apparatus according to a first embodiment of the present invention.

Exemplary embodiments of the invention will now be described below with reference to the accompanying drawings. The described exemplary embodiments are intended to assist the understanding of the invention, and are not intended to limit the scope of the invention in any way. In these drawings, like reference numerals identify like elements.

An optical fiber processing apparatus according to the first embodiment of the present invention will now be described with reference to FIGS. 1 to 11.

The optical fiber processing apparatus employs only a single suction pump to perform the operation of exposing an optical fiber to deuterium containing gas, the objective being realized through the opening and closing of a plurality of valves disposed in the circuit portion. More specifically, the operations of the valves disposed on the circuit portion forms respectively, a first channel for returning the deuterium containing gas within the reactor to a storage chamber, a second channel for rendering the pressure inside the reactor atmospheric pressure, a third channel for decompressing the inside of the reactor and a fourth channel for supplying deuterium containing gas inside the storage chamber into the reactor.

FIG. 1 shows an optical fiber processing apparatus 1 according to the first embodiment.

The optical fiber processing apparatus 1 comprises a reactor 3, a storage chamber 5, a single suction pump 7, and a circuit portion 9 connecting the reactor 3, storage chamber 5 and suction pump 7.

The reactor 3 can accommodate internally an optical fiber 13 wound by a winding drum 11 and has a port (not shown) into and out from which the winding drum 11 can enter into and move out from. Further, the reactor 3 is extremely pressure tight and tightly sealed thereby enabling the reactor 3 to be used as a decompression chamber.

The storage chamber 5 is connected via a gas input valve 15 to a gas cylinder 17 filled with deuterium containing gas. When the gas input valve 15 is opened deuterium containing gas is delivered from the gas cylinder 17 to the inside of the storage chamber 5. Here, deuterium containing gas may be a gas mixture containing deuterium gas or simply deuterium gas.

The suction pump 7 is a single directional flow type pump that intakes from an intake port 19 and expels through an outlet port 21.

The circuit portion 9 has first to seventh open/close valves V1, V2, V3, V4, V5, V6 and V7. The first, second, sixth and seventh valves V1, V2, V6 and V7 are connected to the suction pump 7 on the side of the intake port 19. The third, fourth and fifth valves, V3, V4 and V5 are connected to the suction pump 7 on the side of the outlet port 21.

More specifically, the first valve V1 is disposed in a passage (route) 31 connecting the intake port 19 of the suction pump 7 and the reactor 3. The second valve V2 is disposed in a passage 32 connecting the intake port 19 of the suction pump 7 and the storage chamber 5. The third valve V3 is disposed in a passage 33 connecting the outlet port 21 of the suction pump 7 and the storage chamber 5. The fourth valve V4 is disposed in a passage 34 connecting the outlet port 21 of the suction pump 7 and the reactor 3.

The fifth valve V5 and the sixth valve V6 are to open to atmosphere. The fifth valve V5 is disposed in passage 35 connecting from the intake port 21 of the suction pump 7 to the outside atmosphere. The sixth valve V6 is disposed in a passage 36 connecting from the reactor 3 to the outside atmosphere. The seventh valve V7, is for opening/closing the reactor 3 and is disposed in a passage 37 for introducing gas into the reactor 3.

It is apparent that the configuration of the circuit portion 9 enables a first channel L-1 through which deuterium containing gas moves from the reactor 3 to the storage chamber 5 to be obtained by a first valve operation that opens the first, third and seventh valves, V1, V3 and V7 from among the plurality of valves. Further, a second channel L-2, through which air moves towards the reactor 3, is obtained by a second valve operation that opens the sixth and seventh valves V6 and V7. Again, a third channel L-3 through which air inside the reactor 3 is drawn, facilitating decompression inside the reactor 3, is obtained by a third valve operation that opens the first, fifth and seventh valves, V1, V5 and V7. Moreover, a fourth channel L-4 through which deuterium containing gas passes from the storage chamber 5 towards the reactor 3, is obtained by a fourth valve operation that opens the second, fourth and seventh valves, V2, V4 and V7.

Here, the relationship between the first to the fourth valve operations with respect to the first to the seventh valves V1, V2, V3, V4, V5, V6 and V7 and the first to fourth channels, L-1, L-2, L-3 and L-4 can be altered in accordance with the configuration of the circuit incorporating the layout of each of the passages and valves, such that the relationship as indicated with respect to this embodiment shown in FIG. 1 is not fixed.

The operations of the optical fiber processing apparatus 1 will now be described with reference to FIGS. 2 to 11.

Figure 2:
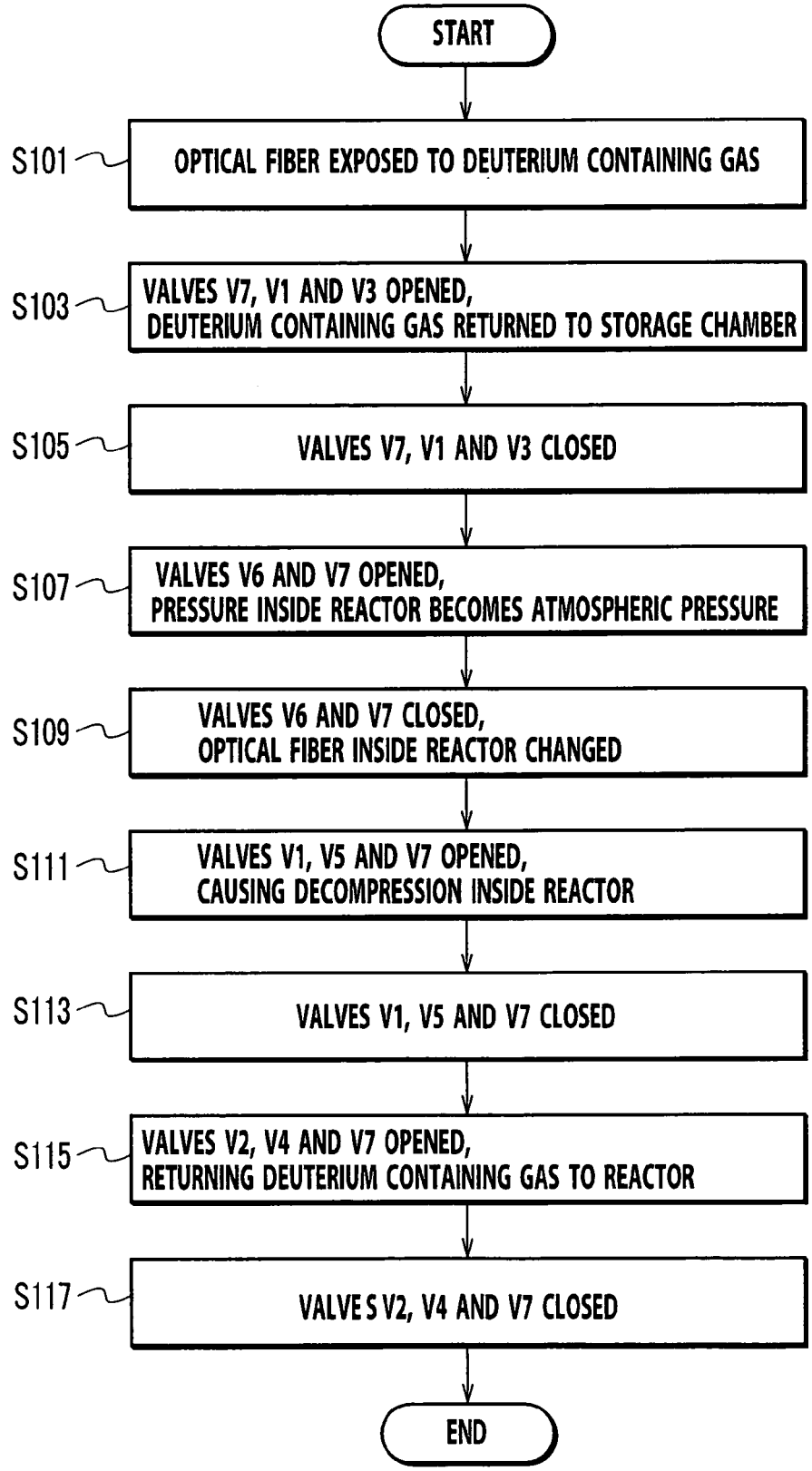
FIG. 2 is a flowchart showing the operations for processing an optical fiber using the optical fiber processing apparatus according to the first embodiment.

FIG. 2 shows the steps performed when exposing an optical fiber to deuterium containing gas using the optical fiber processing apparatus 1.

Figure 3:
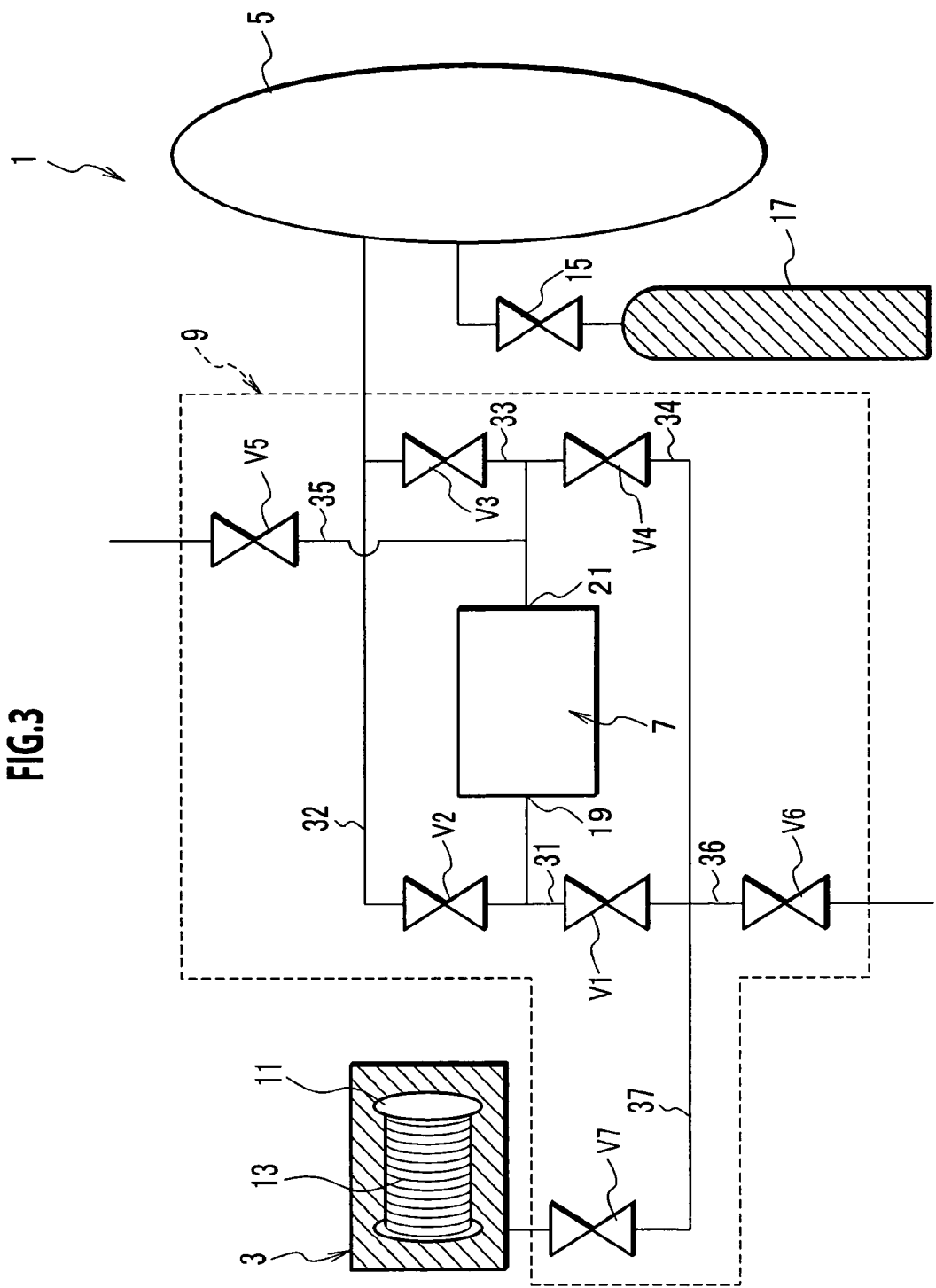
FIG. 3 illustrates the optical fiber processing apparatus of the first embodiment in the condition when an optical fiber is exposed to deuterium containing gas inside the reactor.

At step S101, as shown in FIG. 3, an optical fiber 13 is exposed in an atmosphere of deuterium containing gas (shaded in the figures) inside the reactor 3 for a predetermined time.

Figure 4:
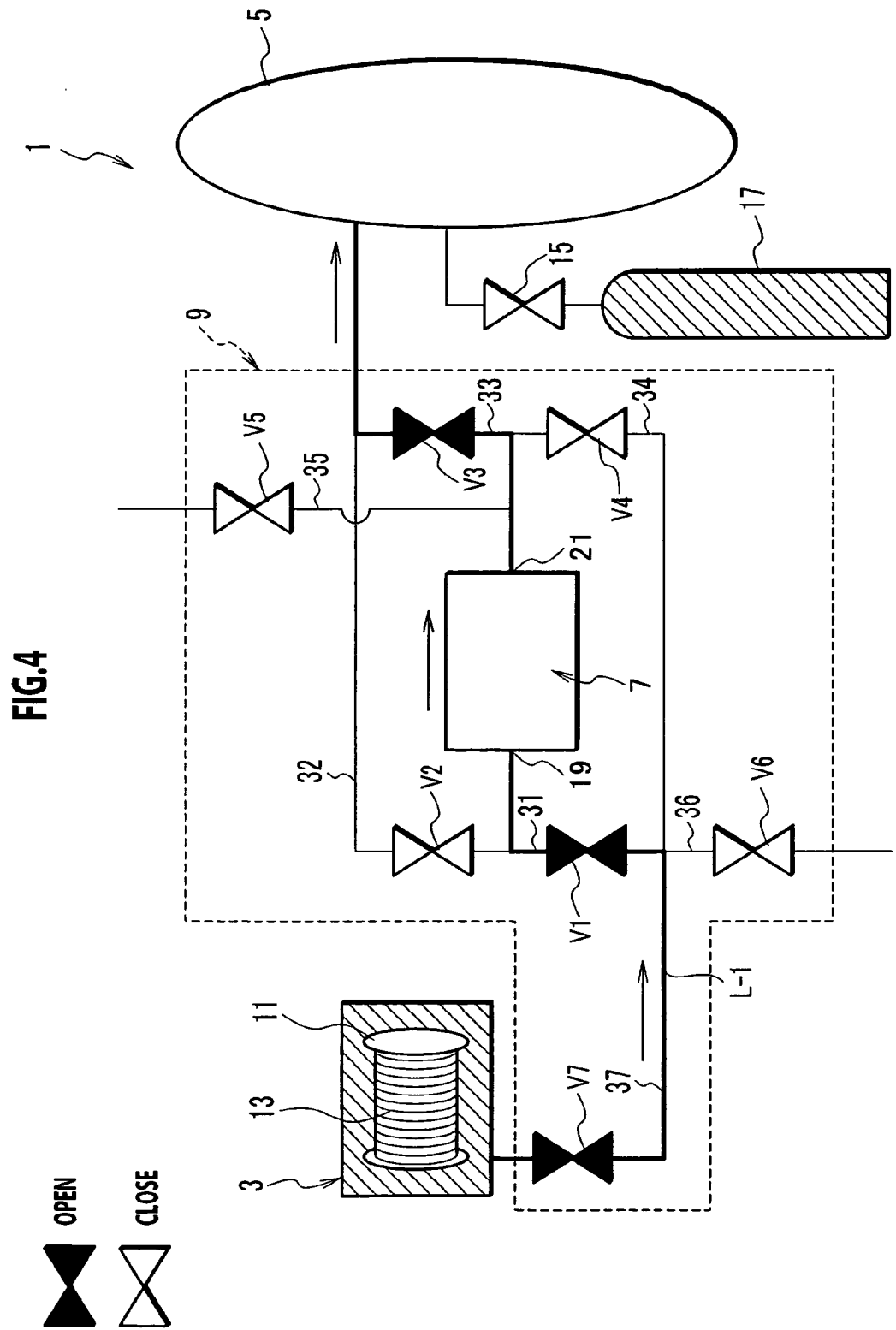
FIG. 4 shows the optical fiber processing apparatus of the first embodiment when a first valve operation is performed such that the first, third and seventh valves are open.

At step S103, as shown in FIG. 4, the first, third and seventh valves, V1, V3 and V7 switch to open (through the first valve operation), and the deuterium containing gas inside the reactor 3 returns into the storage chamber 5 through the first channel L-1 that is passing through the suction pump 7.

Figure 5:
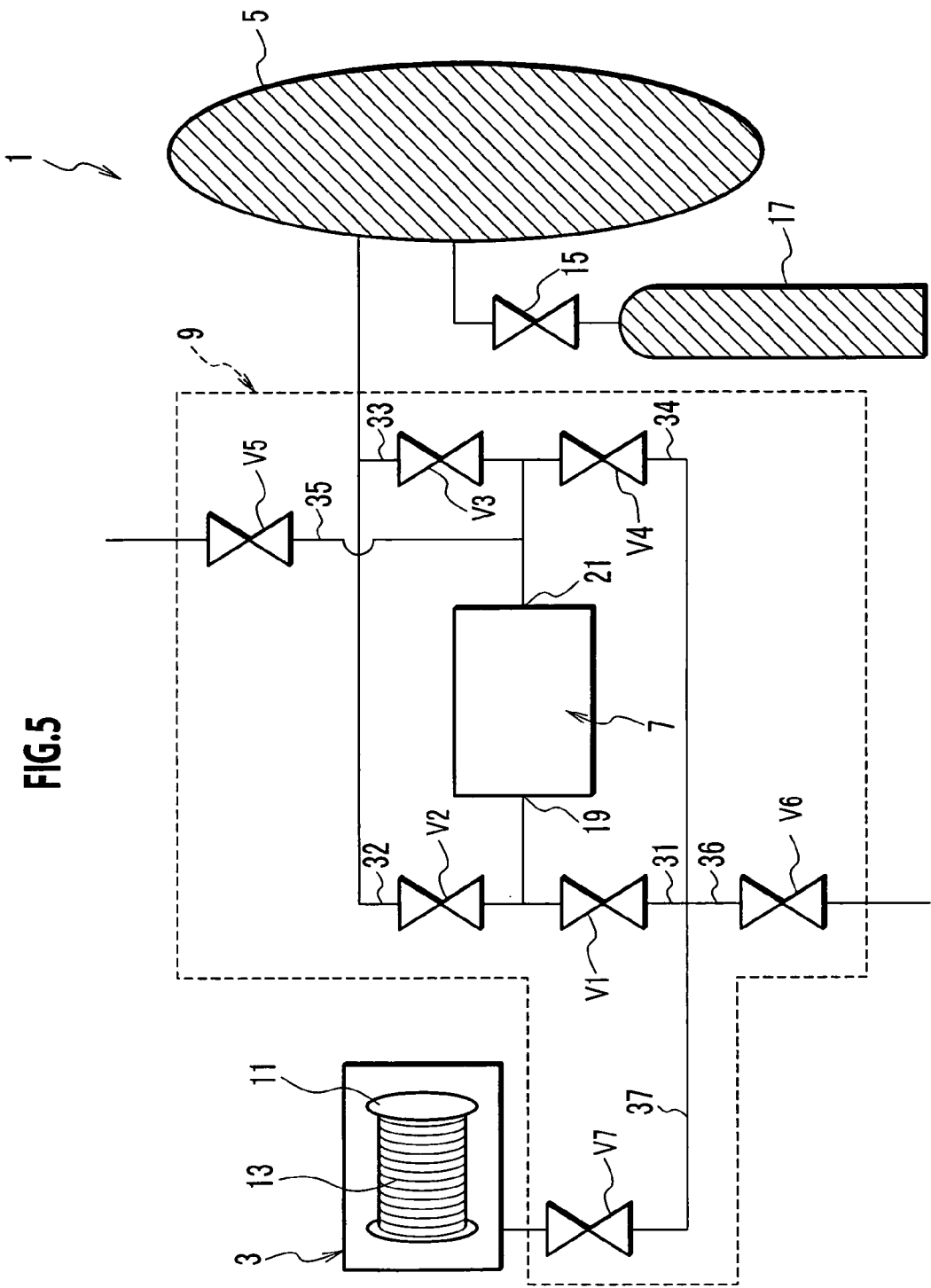
FIG. 5 shows the optical fiber processing apparatus of the first embodiment in the condition when the deuterium containing gas is returned to the storage chamber.

At step S105, the first, third and seventh valves V1, V3 and V7 switch back to closed as shown in FIG. 5.

Figure 6:
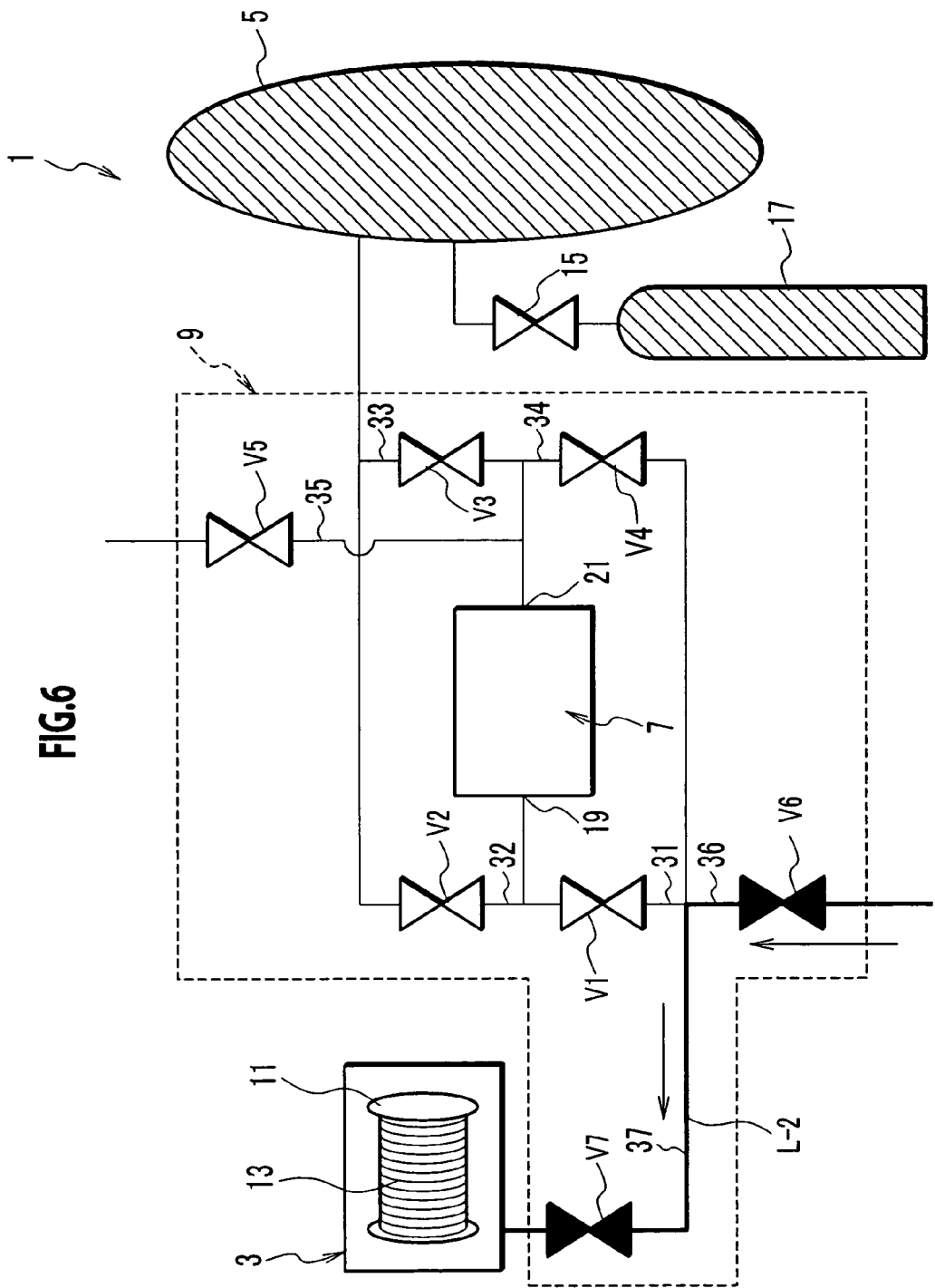
FIG. 6 shows the optical fiber processing apparatus of the first embodiment when a second valve operation is performed such that the sixth and seventh valves are open.

At step S107, as shown in FIG. 6, the sixth and seventh valves V6 and V7 switch to open (through the second valve operation), such that air from the atmosphere is delivered into the reactor 3 through the second channel L-2, making the pressure inside the reactor atmospheric pressure.

Figure 7:
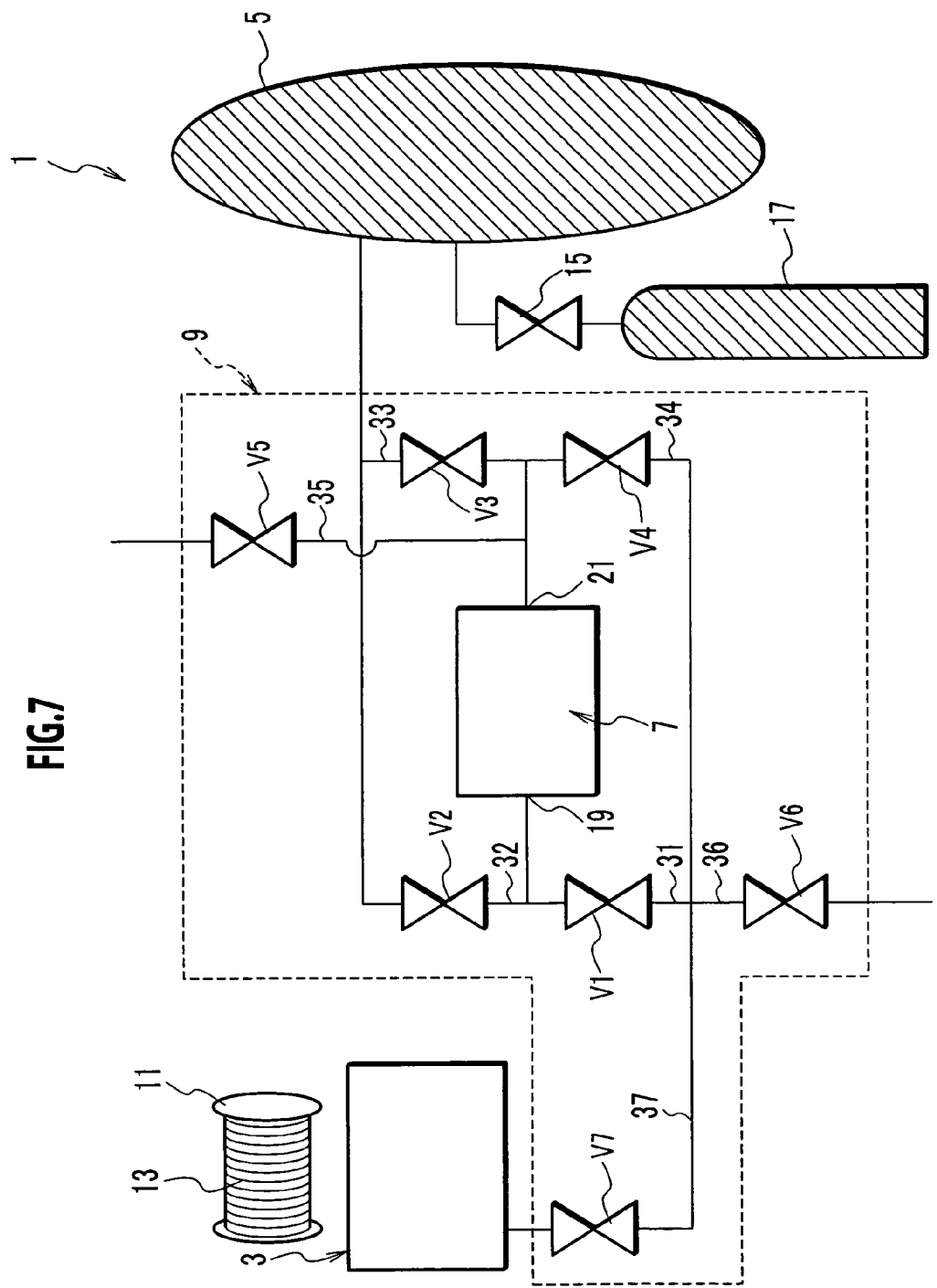
FIG. 7 shows the optical fiber processing apparatus of the first embodiment in the condition when an optical fiber inside the reactor is replaced.

At step S109, the sixth and seventh valves, V6 and V7 again switch to closed as shown in FIG. 7. The optical fiber 13 processing of which is completed is delivered from the reactor 3 and the next optical fiber 13 to be processed is set inside the reactor 3.

Figure 8:
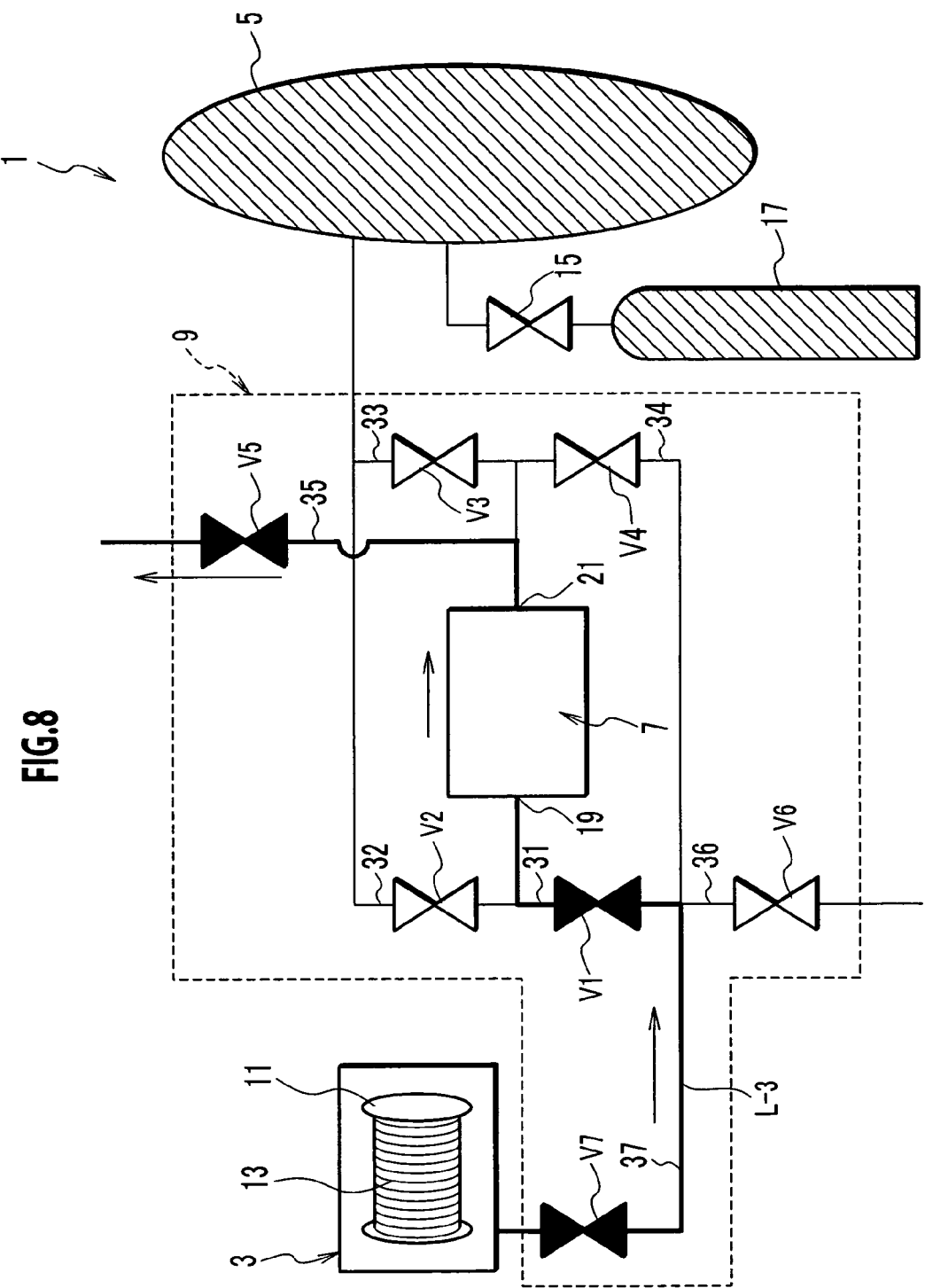
FIG. 8 shows the optical fiber processing apparatus of the first embodiment when a third valve operation is performed such that the first, fifth and seventh valve are open.

At step S111, as shown in FIG. 8, the first, fifth and seventh valves V1, V5 and V7 switch to open (through the third valve operation), and the air inside the reactor 3 is drawn down through the channel L-3 that is passing through the suction pump 7, such that inside the reactor 3 becomes a decompression chamber. The pressure inside the reactor 3 is thus reduced to an absolute pressure below 20 kPa for example.

Figure 9:
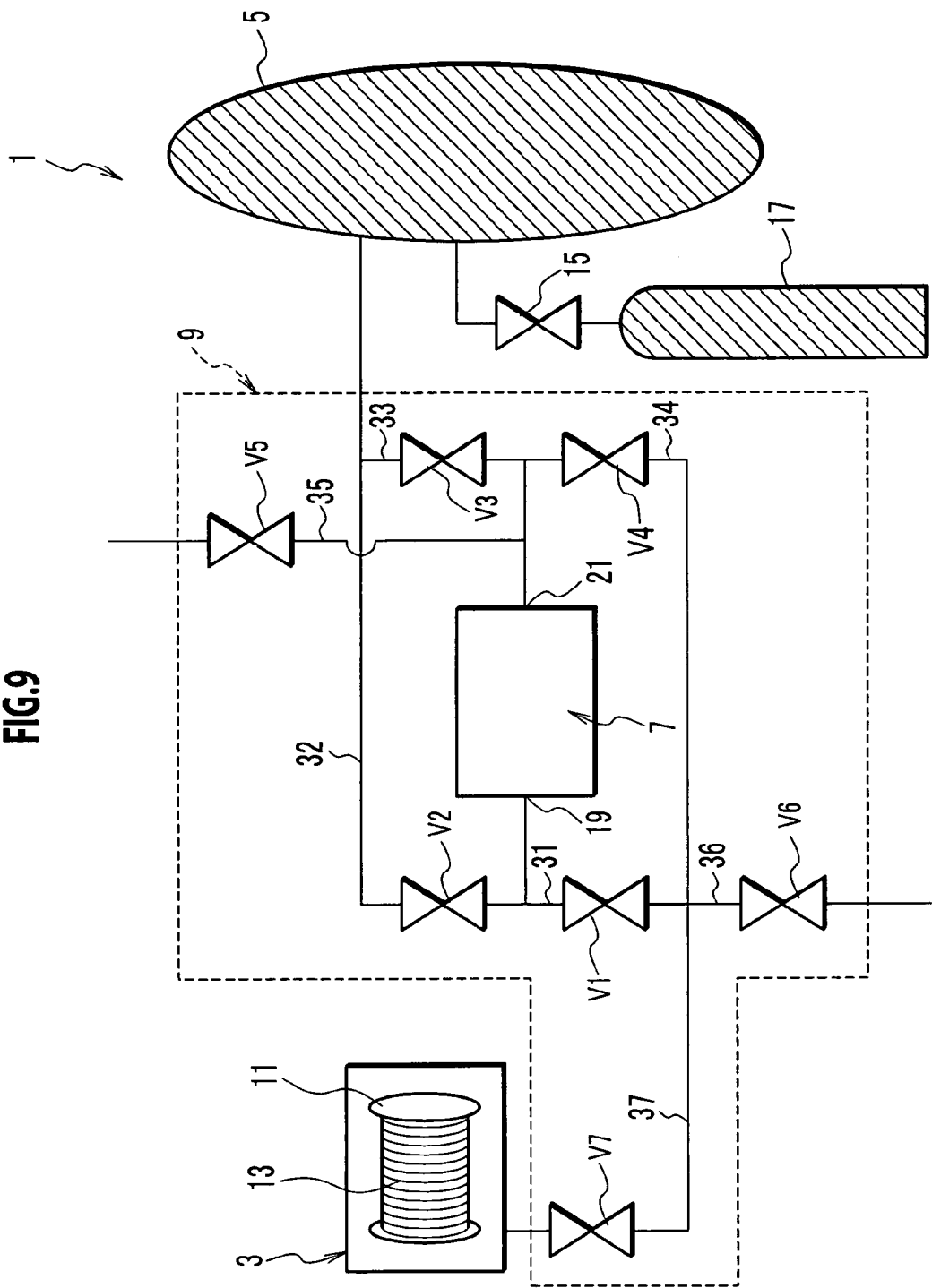
FIG. 9 shows the optical fiber processing apparatus of the first embodiment in the condition when decompression of the reactor is complete.

At step S113, the first, the first, fifth and seventh valves V1, V5 and V7 again switch to closed as shown in FIG. 9.

Figure 10:
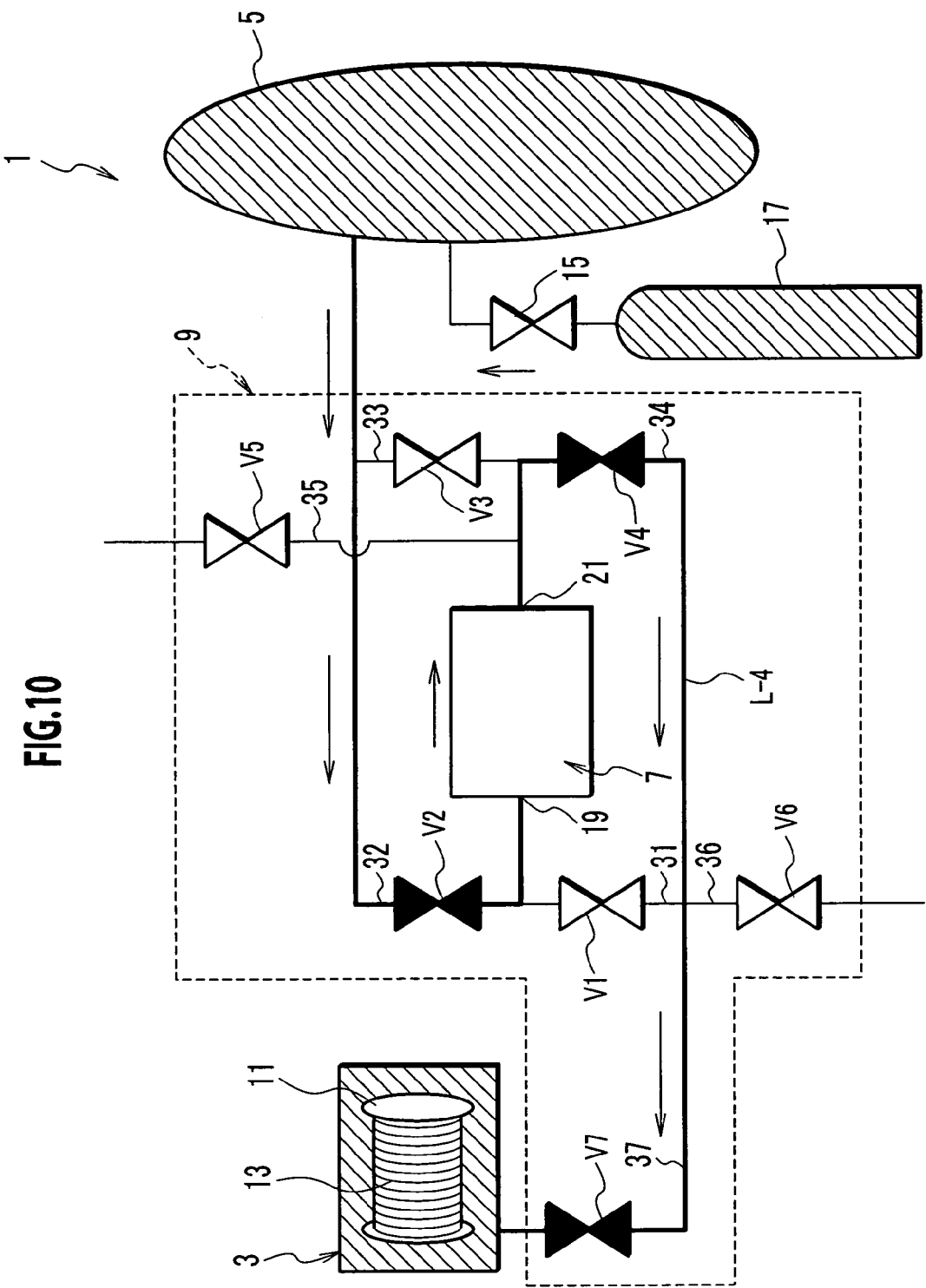
FIG. 10 shows the optical fiber processing apparatus of the first embodiment when the fourth valve operation is performed such that the second, fourth and seventh valves are open.

At step S115, as shown in FIG. 10, the second, fourth and seventh valves V2, V4 and V7 switch to closed (through the fourth valve operation), and the deuterium containing gas inside the storage chamber 5 is supplied into the reactor 3 through the channel L-4 that is passing through the suction pump 7.

At step S117 after supply of the deuterium containing gas to the reactor 3 is complete, the second, fourth and seventh valves V2, V4 and V7 switch to closed again and the optical fiber processing apparatus 1 returns to the condition shown in FIG. 3. Thereafter, the steps described in steps S101 to S117 are repeated and the optical fiber apparatus 1 repeats the processes shown in FIGS. 3 to 10.

The only pump required for this series of operations is the suction pump 7.

Figure 11:
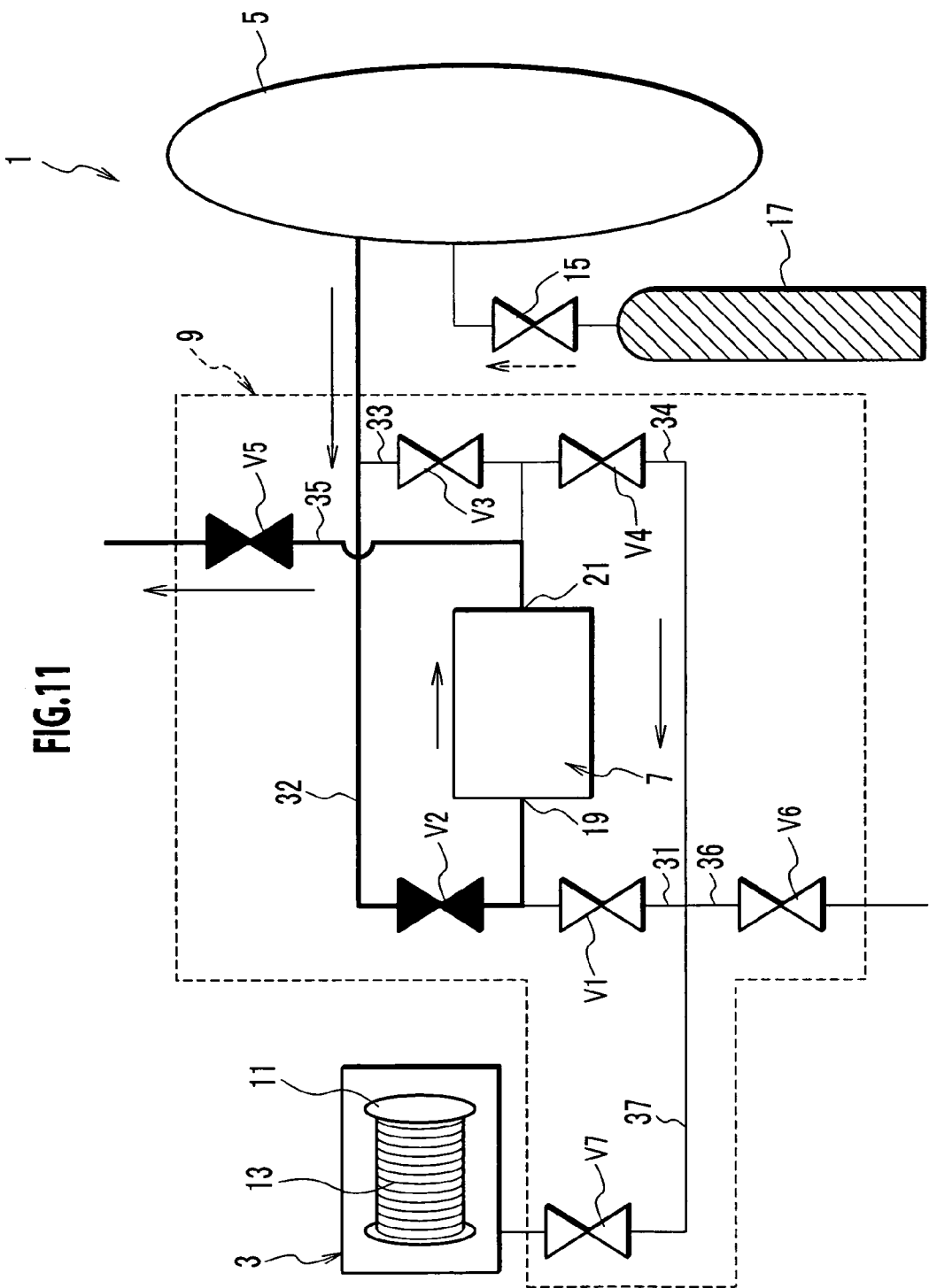
FIG. 11 shows the optical fiber processing apparatus of the first embodiment in the condition when the second and fifth valves are open and degraded deuterium containing gas inside the storage chamber is released into the atmosphere in order to enable replacement with new deuterium containing gas.

Deuterium containing gas can be used repeatedly however after a certain number of times, determined according to experiment as approximately 100, degradation results. At such times, the second and fifth valves V2 and V5 are opened, as shown in FIG. 11, and the degraded deuterium containing gas inside the storage chamber 5 is released into the atmosphere, so that new deuterium containing gas can be supplied from the gas cylinder 17.

The optical fiber processing apparatus 1 of the first embodiment of this invention enables a first channel L-1 to be obtained through the first valve operation, which channel allows deuterium containing gas inside the reactor 3 to return inside the storage chamber 5 via the suction pump 7 after operations within the reactor 3 are complete. Further, a second channel L-2 can be obtained through the second valve operation, which channel delivers air toward the reactor 3, rendering the pressure within the reactor 3 atmospheric pressure. Again, a third channel L-3 can be obtained through the third valve operation, which channel facilitates decompression within the reactor 3 as air inside the reactor 3 is expelled out into the atmosphere via the suction pump 7. Moreover, a fourth channel L-4 can be obtained through the fourth valve operation, which channel supplies deuterium containing gas within the storage chamber 5 into the reactor 3 via the suction pump 7. Accordingly, each of the above described operations can be performed using the single suction pump 7.

An optical fiber processing apparatus according to the second embodiment of the present invention will now be described with reference to FIGS. 12 to 21.

The optical fiber processing apparatus includes a plurality of reactors and utilizes a storage chamber having the same capacity as each of the reactors in which the pressure is usually set from vacuum to atmospheric pressure, instead of employing a large, pressure tight storage chamber. Further, the storage chamber of the embodiment is used not only as a temporary holding chamber holding the deuterium containing gas of each of the reactors, but also as a chamber for supplying new deuterium containing gas when the existing deuterium containing gas requires replacement.

Figure 12:
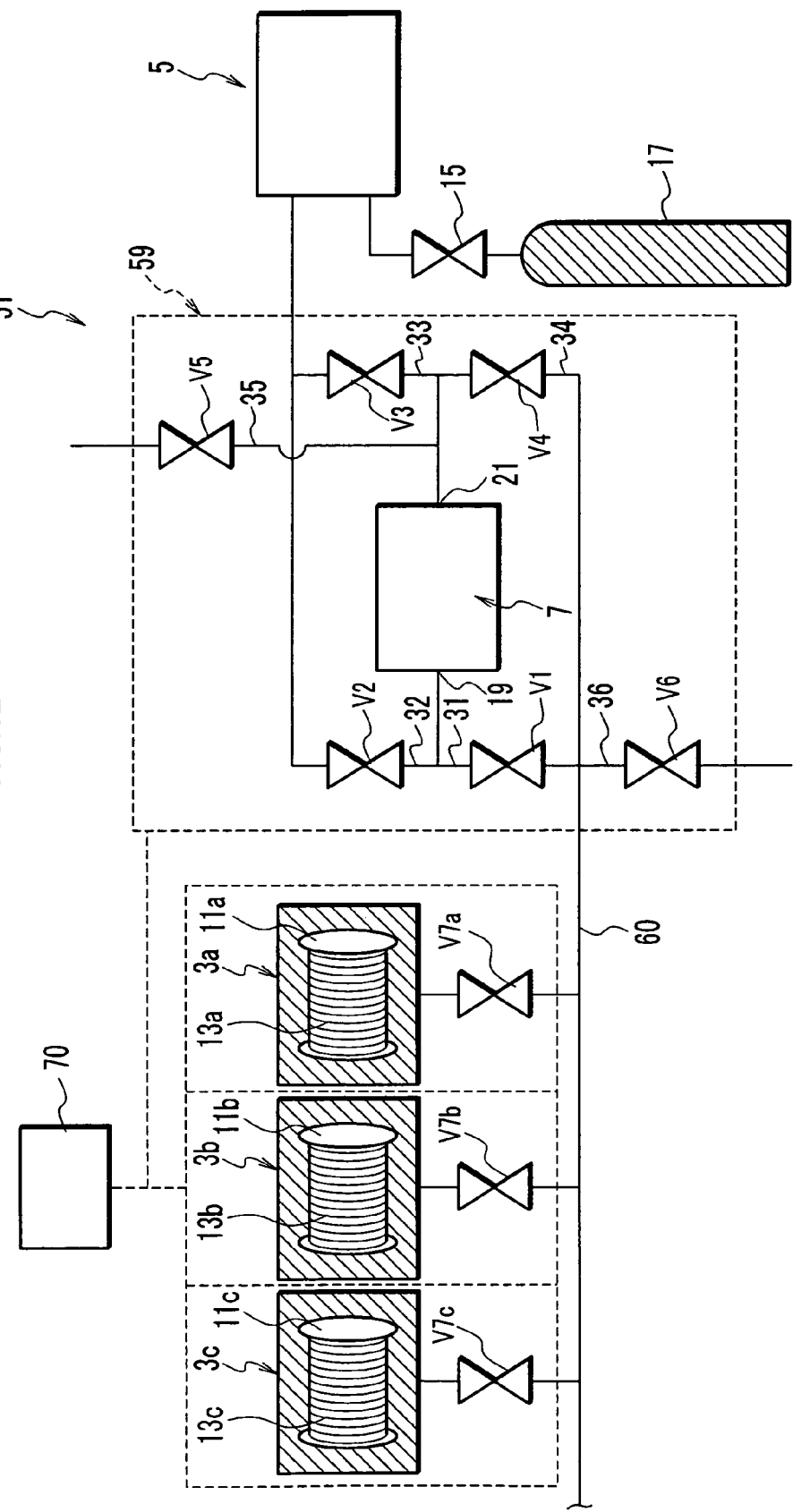
FIG. 12 is a schematic block diagram of an optical fiber processing apparatus according to a second embodiment of the present invention.

FIG. 12 shows an optical fiber processing apparatus 51 according to the second embodiment.

The optical fiber processing apparatus 51 comprises, for example, first, second and third reactors 3a, 3b and 3c, a single storage chamber 5, a single suction pump 7 and a circuit portion 59.

The first, second and third reactors 3a, 3b and 3c are filled with deuterium containing gas and connected to a connection circuit (connecting passage) 60 in parallel via open/close valves 7a, 7b and 7c, respectively.

The first, second and third reactors 3a, 3b and 3c can each accommodate respectively optical fibers 13a, 13b and 13c wound by the respective winding drums 11a, 11b and 11c, and each reactor has a port (not shown) through which the respective winding drums 11a, 11b and 11c can be taken in and out. Further, the first, second and third reactors 3a, 3b and 3c are pressure tight and tightly sealed thereby enabling these reactors to operate as decompression chambers.

Moreover, the opening and closing of the valves V7a, V7b and V7c of the reactors 3a, 3b and 3c is controlled by a program of a control part 70, such that when one of these reactors is in a condition in which reaction therein is stopped, the other reactors are in a condition in which reaction therein (exposure of optical fiber to deuterium containing gas) is occurring. Changing operations, such as collection and supply of the deuterium gas, or change of the optical fiber, can be performed while the reactor is in a reaction stopped condition.

Figure 13:
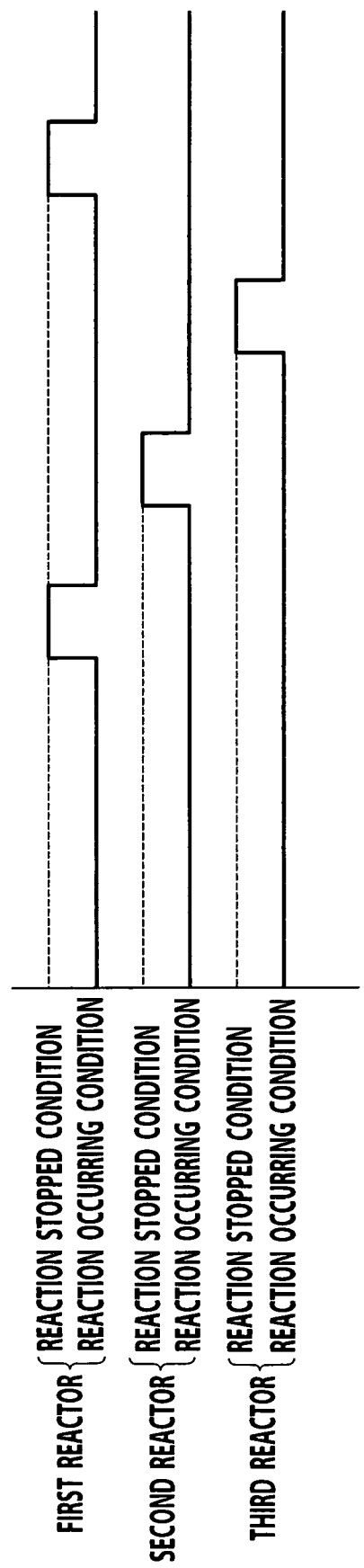
FIG. 13 is a time chart showing the condition of operations of the first, second and third reactors [of the second embodiment according to the present invention]

FIG. 13 shows the sequence of switchover between the reaction stopped condition and reaction occurring condition of each of the reactors. As shown in FIG. 13, the first, second and third reactors 3a, 3b and 3c are controlled by the program such that the time in which the respective reactors enter a reaction stopped condition is staggered. That is to say, when the first reactor 3a is in a reaction stopped condition, the second and third reactors 3b and 3c are in a reaction occurring condition, and when the first reactor 3a comes into a reaction occurring condition again, the second and third reactors 3b and 3c sequentially enter a reaction stopped condition. The time period of the reaction stopped condition is determined due to considerations of the time required for operations for changing the optical fiber and deuterium containing gas, so that these operations can be completed without obstacle on a reactor while the reactor is in a reaction stopped condition.

Referring again to FIG. 12, the storage chamber 5 is connected to the gas cylinder 17 filled with deuterium containing gas via a valve 15 for introducing gas. The capacity of the storage chamber 5 is set to be equivalent to the capacity of each of the reactors 3a, 3b and 3c.

Normally, the storage chamber 5 is in an empty, waiting condition and the inside of the storage chamber 5 is set between vacuum and atmospheric pressure. When the reaction operation (the exposure operation) is complete in any of the reactors 3a, 3b or 3c, the storage chamber 5 is utilized as a temporary holding chamber for holding the deuterium containing gas from the reactor.

Deuterium containing gas inside each of the reactors 3a, 3b and 3c deteriorates after repeated use. Thus, when changing the deuterium containing gas inside each of the reactors 3a, 3b and 3c, the storage chamber 5 can be used as a means of supplying new deuterium containing gas to the required reactor. That is to say, after the degraded deuterium containing gas inside a reactor is expelled into the atmosphere, the gas input valve 15 is opened and new deuterium containing gas is filled into the storage chamber 5 from the gas cylinder 17 which can then be delivered into the empty reactor. The deuterium containing gas may be a mixture containing deuterium gas or simply deuterium gas.

The suction pump 7 may be either a scroll type or a diaphragm type having an intake port 19 and outlet port 21, being a single directional flow type in which intake occurs through the intake port 19 and expulsion occurs from the outlet port 21.

The circuit portion 59 has first through sixth open/close valves V1, V2, V3, V4, V5 and V6, the opening and closing of which valves is controlled by a control part 70. The first, second and sixth valves V1, V2 and V6 are connected on the side of the intake port 19 of the suction pump 7 while the third, fourth and fifth valves V3, V4 and V5 are connected on the side having the outlet port 21 of the suction pump 7.

More specifically, the first valve V1 is disposed on a passage 31 connecting the intake port 19 of the suction pump 7 and the connection passage 60. The second valve V2 is disposed on a passage 32 connecting the intake port 19 of the suction pump 7 and the storage chamber 5. The third valve V3 is disposed on a passage 33 connecting the outlet port 21 of the suction pump 7 and the storage chamber 5. The fourth valve V4 is disposed on a passage 34 connecting the outlet port 21 of the suction pump 7 and the connection pipe 60.

The fifth valve V5 and the sixth valve V6 are to open to atmosphere. The fifth valve V5 is disposed on a passage 35 passing from the outlet port 21 of the suction pump 7 to the external atmosphere. The sixth valve V6 is disposed on a passage 36 passing from the connection pipe 60 to the external atmosphere.

The operations of the first, second and third reactors 3a, 3b and 3c will now be described with reference to FIGS. 14 to 21, using the first reactor 3a as an example.

Figure 14:
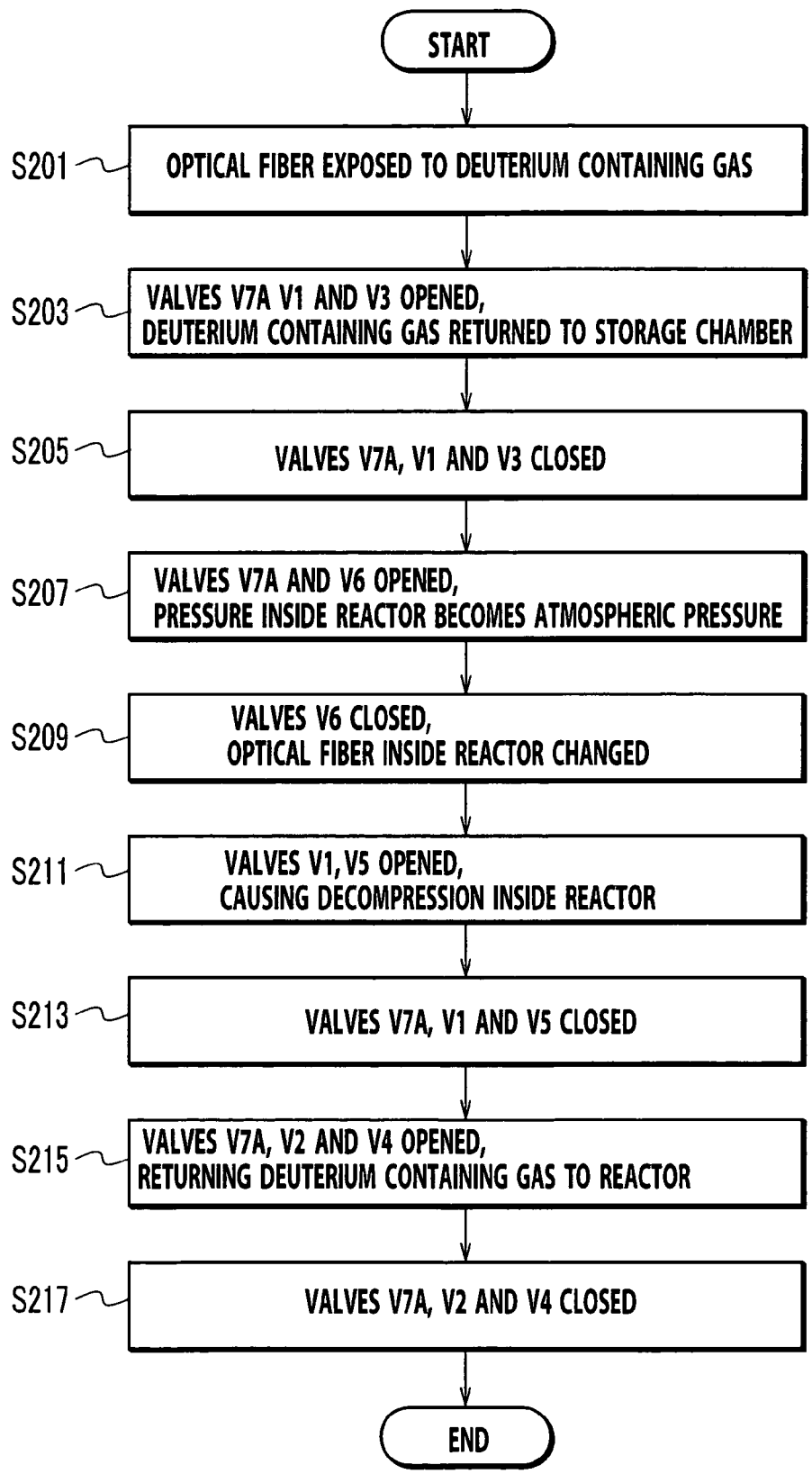
FIG. 14 is a flowchart showing the operations for processing an optical fiber using the optical fiber processing apparatus according to the second embodiment.

FIG. 14 shows the steps involved in processing an optical fiber using the first reactor 3a in which an optical fiber is exposed to deuterium containing gas.

At step S201, as shown in FIG. 12, inside the first reactor 3a the optical fiber 13a is exposed for a predetermined time in an atmosphere of deuterium containing gas.

Figure 15:
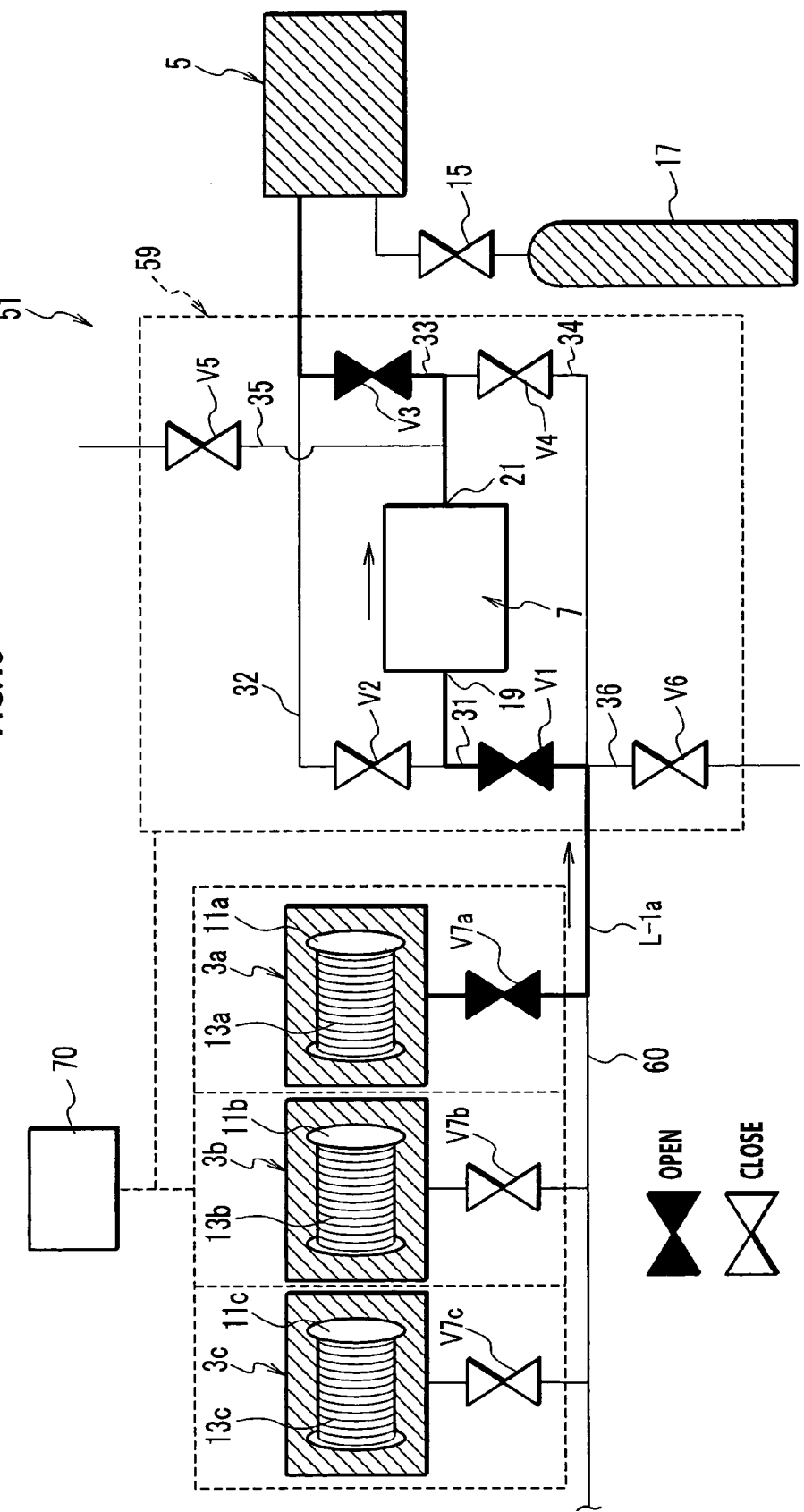
FIG. 15 shows the optical fiber processing apparatus according to the second embodiment when the first valve operation is performed for the first reactor.

At step S203, as shown in FIG. 15, with the valve V7a of the first reactor 3a in an open condition, the first valve operation opening the first and third valves V1 and V3 is performed. This establishes the first channel L-1a from the first reactor 3a toward the storage chamber 5 such that deuterium containing gas is delivered from the first reactor 3a to the inside of the storage chamber 5.

Figure 16:
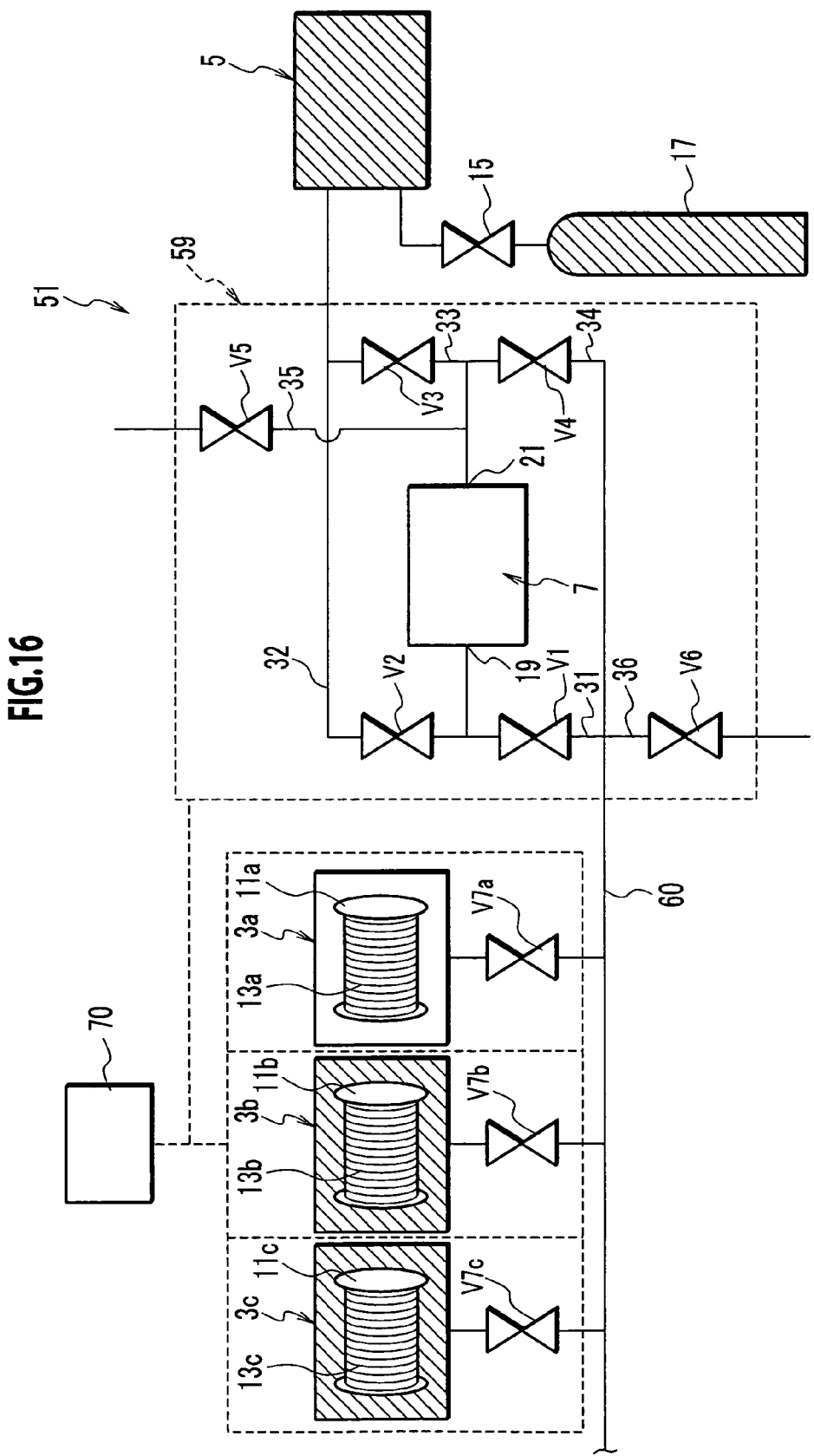
FIG. 16 shows the optical fiber processing apparatus according to the second embodiment in the condition when the deuterium containing gas is returned to the storage chamber.

At step S205, as shown in FIG. 16, the valve V7a and the first and third valves V1 and V3 close again.

Figure 17:
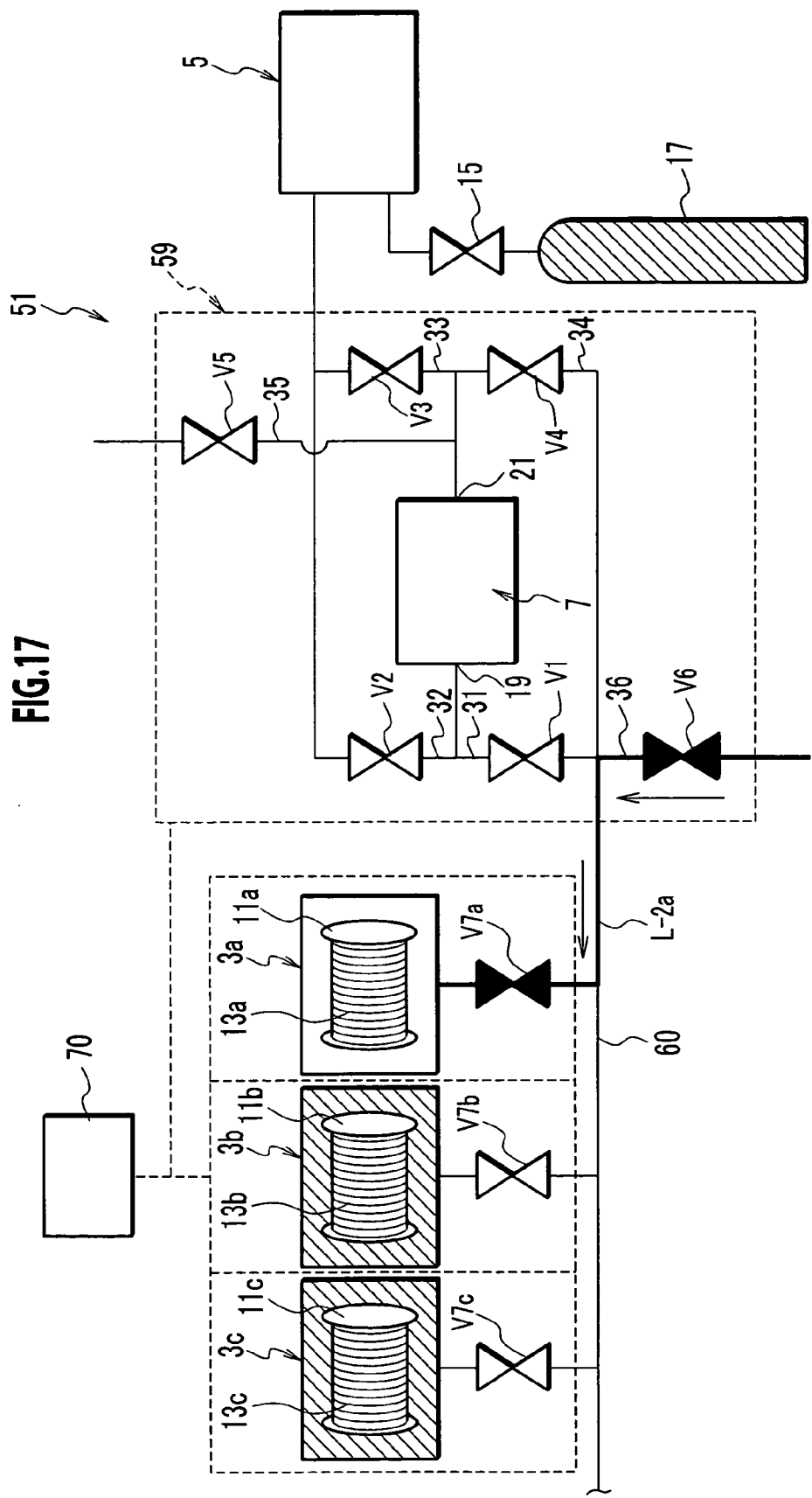
FIG. 17 shows the optical fiber processing apparatus of the second embodiment when the second valve operation is performed for the first reactor.

At step S207, as shown in FIG. 17, the second channel L-2a is established by the second valve operation opening the valve V7a and the sixth valve V6, thereby directing air toward the first reactor 3a.

Figure 18:
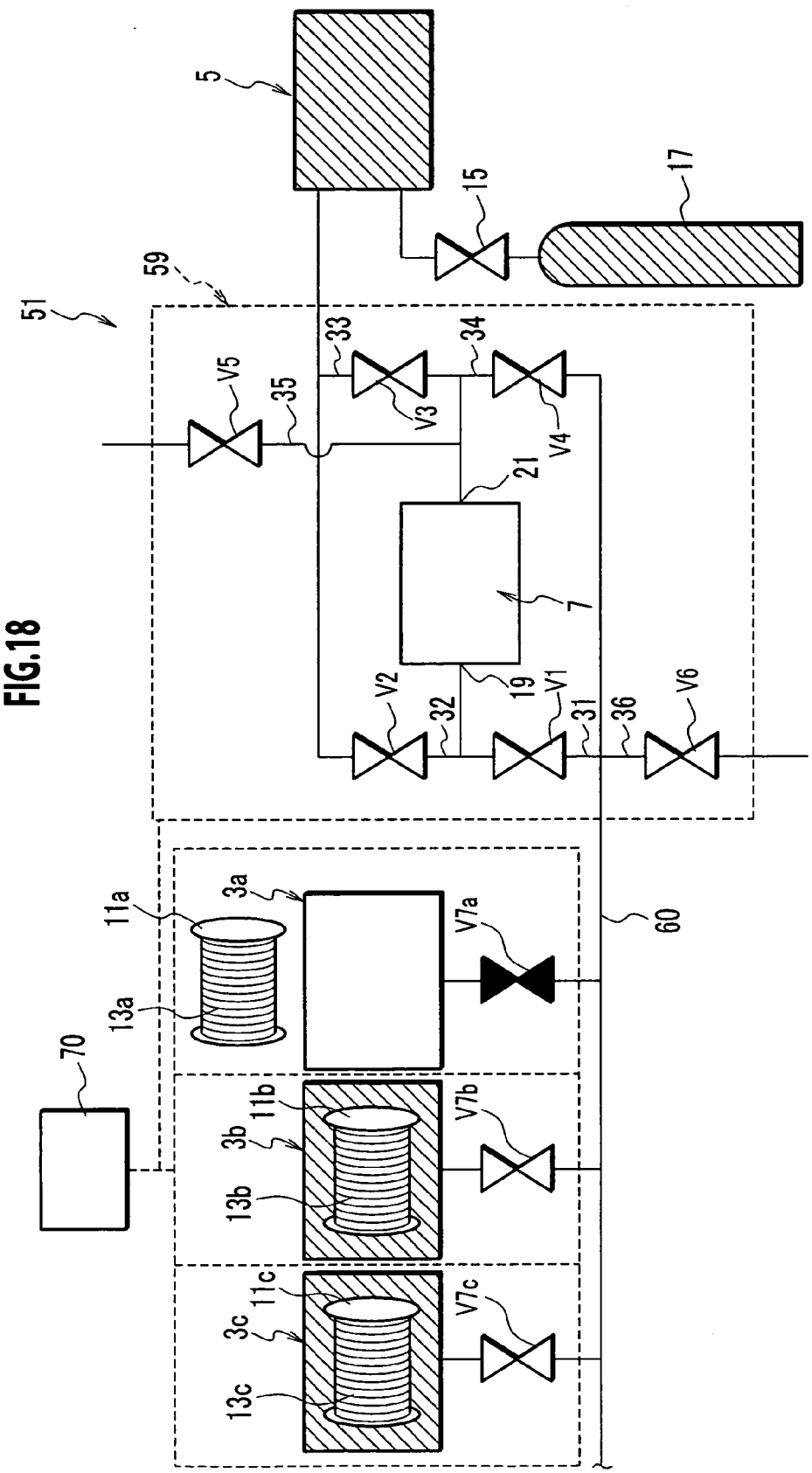
FIG. 18 shows the optical fiber processing apparatus of the second embodiment in the condition when an optical fiber inside the reactor is replaced.

At step S209, as shown in FIG. 18, the sixth valve V6 is again closed and work is performed to change the optical fiber 5a in the first reactor 3a which has reverted to atmospheric pressure.

Figure 19:
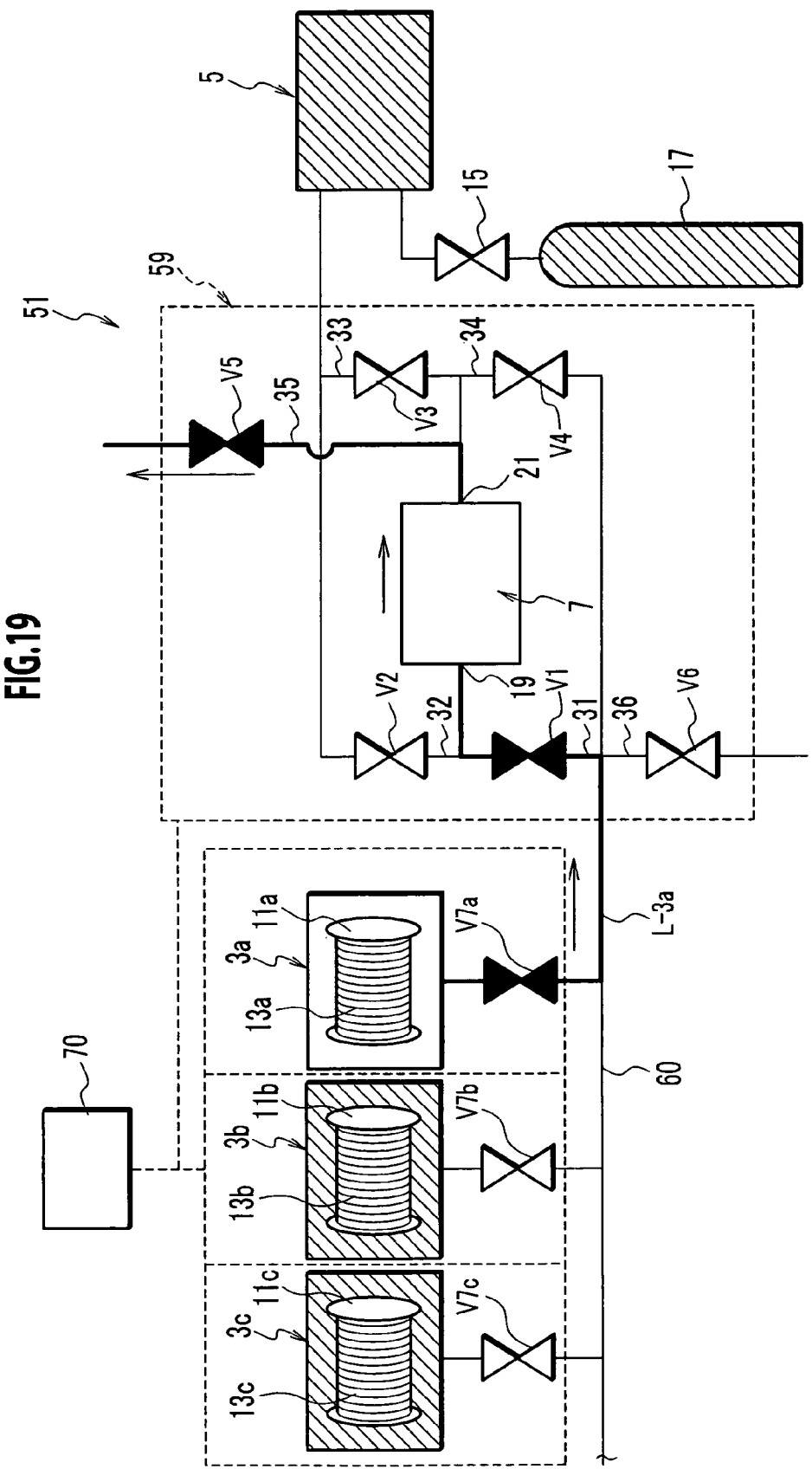
FIG. 19 shows the optical fiber processing apparatus of the second embodiment when the third valve operation is performed for the first reactor.

At step S211, as shown in FIG. 19, the third channel L-3a is established by the third valve operation opening the first and fifth valves V1 and V5, and air is drawn out from the first reactor 3a such that the first reactor 3a is decompressed to an absolute pressure of for example below 20 kPa.

Figure 20:
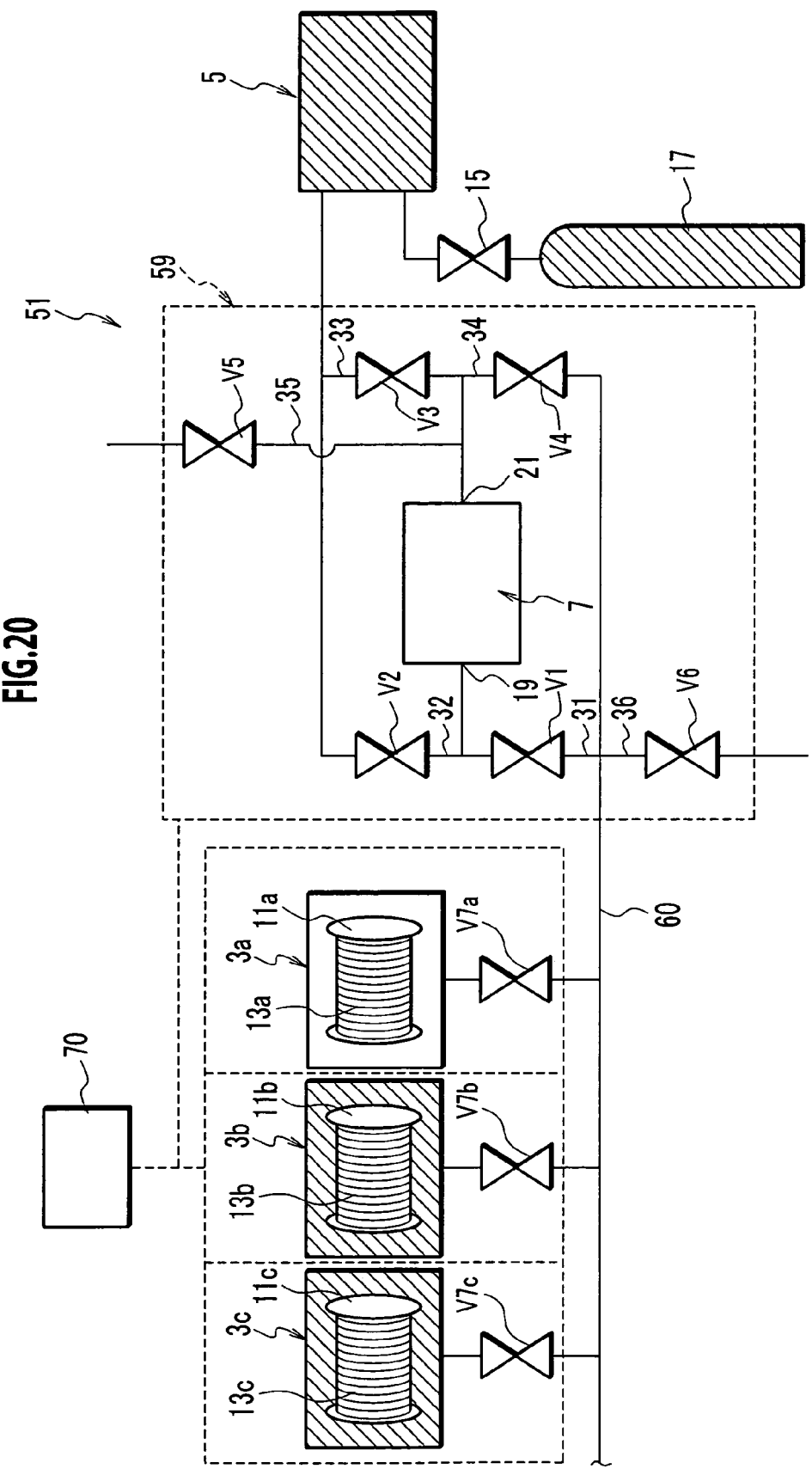
FIG. 20 shows the optical fiber processing apparatus of the second embodiment in the condition when decompression of the first reactor is complete.

At step S213, as shown in FIG. 20, the valve V7a and the first and fifth valves V1 and V5 are closed again.

Figure 21:
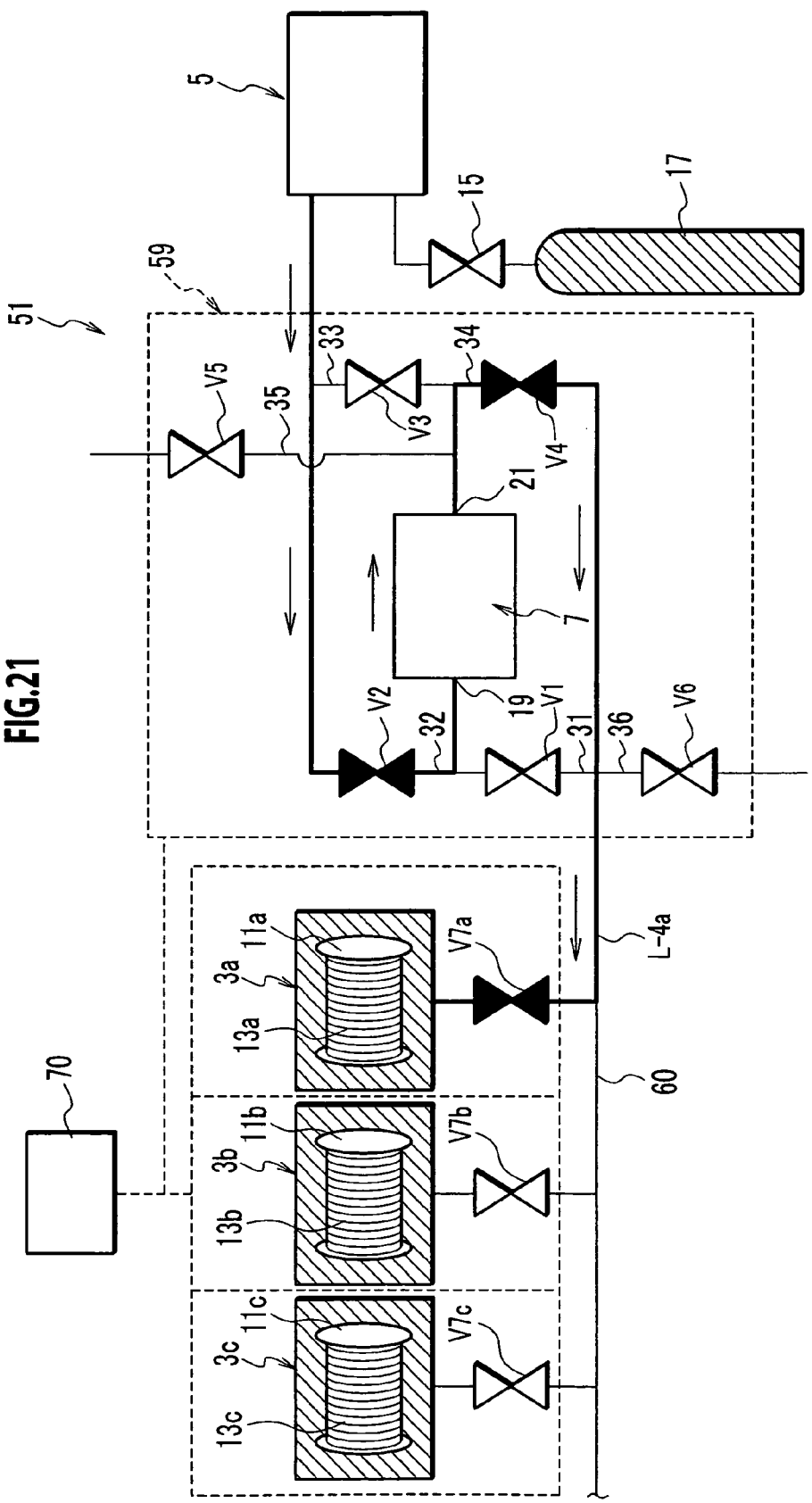
FIG. 21 shows the optical fiber processing apparatus of the second embodiment when the fourth valve operation is performed for the first reactor.

At step S215, as shown in FIG. 21, the fourth channel L-4a passing from the storage chamber 5 to the first reactor 3a is established by the fourth valve operation opening the valve V7a and the second and fourth valves V2 and V4, such that deuterium containing gas inside the storage chamber 5 returns into the first reactor 3a.

At step S217, the valve V7a of the first reactor 3a and the second and fourth valves V2 and V4 are closed again. Thereafter, these steps S201 to S217 shown in FIGS. 12 and 15 to 21 are repeated with respect to the first reactor 3a.

The same steps are repeated with respect to the second and third reactors 3b and 3c. For example, the valve V7b of the second reactor 3b is opened and closed instead of the valve V7a of the first reactor 3a, and opening and closing of the first through sixth valves V1, V2, V3, V4, V5 and V6 are performed in the same way as the above steps S203 to S217 so that the second reactor 3b operates similarly to the first reactor 3a.

The optical fiber processing apparatus 51 according to the second embodiment of the present invention can performs the operation of exposing optical fibers 13a, 13b and 13c inside an atmosphere of deuterium containing gas in parallel, using the plurality of reactors 3a, 3b and 3c.

The system is controlled such that when one reactor 3a among the plurality of reactors 3a, 3b and 3c is in a reaction stopped condition, the other reactors, 3b and 3c are in a reaction occurring condition, therefore the deuterium containing gas inside the reactor 3a in a reaction stopped condition can be temporarily held inside the storage chamber 5. Accordingly, changing operations for the reactor 3a in a reaction stopped condition, such as change of the deuterium containing gas and optical fiber 13a, can be easily performed. After completion of those operations, the first reactor 3a recommences the reaction operations when the deuterium containing gas inside the storage chamber 5 is returned inside the reactor 3a. The single storage chamber 5 is enough for the plurality of reactors 3a, 3b and 3c.

Further, fresh deuterium containing gas is filled into the storage chamber 5, so that degraded deuterium containing gas inside a reactor that has been used repeatedly can be expelled from that reactor and easily replaced with the fresh deuterium containing gas held in the storage chamber 5.

According to the processing apparatus of this invention, a first valve operation is performed thereby establishing a first channel for returning deuterium containing gas inside a reactor to the storage chamber via a suction pump after operations utilizing that deuterium containing gas inside the reactor are completed. A second valve operation establishes a second channel that delivers air towards the reactor, rendering the pressure inside the reactor atmospheric pressure. Moreover, performance of a third valve operation, establishes a third channel, expelling air inside the reactor into the atmosphere via the suction pump, thereby decompressing the inside of the reactor. Again, performance of a fourth valve operation establishes a fourth channel by which deuterium containing gas inside the storage chamber is supplied to the inside of the reactor via the suction pump. Accordingly, all of the above operations can be performed utilizing a single suction pump.

Moreover, according to the processing apparatus of this invention, reaction processes on optical fibers can be performed simultaneously using a plurality of reactors filled with deuterium containing gas. When the reaction process occurring in one of the plurality of reactors is completed, the deuterium containing gas inside the reactor can be temporarily held in a storage chamber. The result is that operations of changing the gas in a reactor and of changing the optical fiber placed in a reactor can be easily performed without hindrance. Even when reaction process in another reactor is completed, the storage chamber can be utilized as a holding chamber in the same way. Accordingly, a single storage chamber is enough for a plurality of reactors.

Further, fresh deuterium containing gas is filled into the storage chamber, so that degraded deuterium containing gas inside a reactor that has been used repeatedly can be expelled from the reactor and easily changed with the fresh deuterium containing gas held in the storage chamber.

While the invention has been shown and described in detail, the foregoing description is in all aspects illustrative and not restrictive. It is therefore understood that numerous modifications and variations can be devised without departing from the scope of the invention.

What is claimed is:

1. An optical fiber processing apparatus comprising:
a reactor chamber that accommodates an optical fiber;
a suction pump having an intake port and an outlet port;
a gas cylinder which provides deuterium containing gas;
a storage chamber into which said deuterium containing gas is delivered from said gas cylinder; and
a circuit portion including a plurality of open/close valves over a plurality of paths that connect said reactor chamber, said suction pump, and said storage chamber, said circuit portion further including:
a first channel that opens through performance of a first valve operation that, after completion of processing, takes in deuterium containing gas inside said reactor chamber from said intake port of said suction pump, and expels out said deuterium containing gas from said outlet port of said suction pump, returning said deuterium containing gas to said storage chamber;
a second channel that opens through performance of a second valve operation that delivers air into said reactor chamber making the pressure inside said reactor chamber atmospheric pressure;
a third channel that opens through performance of a third valve operation, that takes in air inside said reactor chamber from said intake port of said suction pump and expels out said air from said outlet port of said suction pump into the atmosphere, decompressing the pressure inside said reactor chamber; and a fourth channel that opens through performance of a fourth valve operation, that takes in deuterium containing gas inside said storage chamber from said intake port of said suction pump and expels out said deuterium containing gas from said outlet port of said suction pump, supplying said deuterium containing gas to said reactor chamber.

2. An optical fiber processing apparatus for exposing an optical fiber to an atmosphere of deuterium containing gas, said optical fiber processing apparatus comprising:

a reactor chamber that can accommodate an optical fiber and can be filled with deuterium containing gas;

a suction pump having an intake port and an outlet port, that expels gas from and injects gas into said-reactor chamber;

a gas cylinder which provides deuterium containing gas;

a storage chamber which receives said deuterium containing gas from said gas cylinder and which is capable of storing said deuterium containing gas that fills said reactor chamber; and a circuit portion connecting said reactor chamber, said suction pump, said storage chamber, said circuit portion including:

a first open/close valve disposed in a passage connecting said intake port of said suction pump and said reactor chamber;

a second open/close valve disposed in a passage connecting said intake port of said suction pump and said storage chamber;

a third open/close valve disposed in a passage connecting said outlet port of said suction pump and said storage chamber;

a fourth open/close valve disposed in a passage connecting said outlet port of said suction pump and said reactor chamber;

a fifth open/close valve disposed in a passage that passes from said outlet port of said suction pump to the external atmosphere; and a sixth open/close valve disposed in a passage that passes from said reactor chamber to the external atmosphere.

3. An optical fiber processing apparatus for exposing an optical fiber to an atmosphere of deuterium containing gas, said optical fiber processing apparatus comprising:

a reactor chamber that can accommodate an optical fiber and can be filled with deuterium containing gas;

a suction pump having an intake port and an outlet port, that expels gas from and injects gas into said reactor chamber;

a gas cylinder which provides deuterium containing gas;

a storage chamber which receives said deuterium containing gas from said gas cylinder and which is capable of storing said deuterium containing gas to be supplied to said reactor chamber; and a circuit portion connecting said reactor chamber, said suction pump, and said storage chamber, said circuit portion including:

a first channel for returning deuterium containing gas inside said reactor chamber to said storage chamber using said suction pump, that forms an open passage by opening a first open/close valve disposed in a passage connecting said reactor chamber and said intake port of said suction pump and a third open/close valve disposed in a passage connecting said outlet port of said suction pump and said storage chamber;

a second channel for delivering air to said reactor chamber thereby rendering the pressure inside said reactor chamber the same as atmospheric pressure, that forms an open passage by opening a sixth open/close valve disposed in a passage that passes from said reactor chamber to the external atmosphere;

a third channel for expelling the air inside said reactor chamber into the atmosphere using said suction pump, thereby reducing the pressure inside said reactor chamber, that forms an open passage by opening said first open/close valve and a fifth open/close valve disposed in a passage passing from said outlet port of said suction pump to the atmosphere; and a fourth channel for supplying said deuterium containing gas inside said storage chamber to said reactor chamber using said suction pump, that forms an open passage by opening a second open/close valve disposed in a passage connecting said storage chamber and said intake port of said suction pump and a fourth open/close valve disposed in a passage connecting said outlet port of said suction pump and said reactor chamber.

4. An optical fiber processing apparatus for exposing an optical fiber to an atmosphere of deuterium containing gas, said optical fiber processing apparatus comprising:

a plurality of reactor chambers that can each accommodate an optical fiber and can each be filled with deuterium containing gas;

a connection passage to which said plurality of reactors are connected in parallel;

a suction pump having an intake port and an outlet port, that expels gas from and injects gas into said plurality of reactor chambers;

a gas cylinder which provides deuterium containing gas;

a storage chamber which receives said deuterium containing gas from said gas cylinder and which is capable of storing deuterium containing gas to be supplied to each of said plurality of reactor chambers; and a circuit portion connecting said suction pump, said connection passage and said storage chamber, said circuit portion including;

a first open/close valve disposed in a passage connecting said intake port of said suction pump and said connection passage;

a second open/close valve disposed in a passage connecting said intake port of said suction pump and said storage chamber;

a third open/close valve disposed in a passage connecting said outlet port of said suction pump and said storage chamber;

a fourth open/close valve disposed in a passage connecting said outlet port of said suction pump and said connection passage;

a fifth open/close valve disposed in a passage that passes from said outlet port of said suction pump to the external atmosphere; and a sixth open/close valve disposed in a passage that passes from said connection passage to the external atmosphere.

5. The optical fiber processing apparatus as recited in claim 4, wherein said second open/close valve is disposed in a passage directly connecting said intake port of said suction pump and said storage chamber.

6. An optical fiber processing apparatus comprising:

a plurality of reactor chambers each filled with deuterium containing gas which each accommodate optical fibers such that the optical fiber can be inserted in and removed therefrom;

a gas cylinder which provides deuterium containing gas;

a single storage chamber which receives said deuterium containing gas from said gas cylinder and which is capable of storing said deuterium containing gas; and a suction pump for delivering deuterium containing gas from said reactor chambers to said storage chamber and from said storage chamber to said reactor chambers, wherein said plurality of reactor chambers are controlled by a program of a control part such that said plurality of reactor chambers one by one enter a condition in which reactions are not occurring, moreover when a single reactor chamber has entered a condition in which reactions are not occurring the remaining reactor chambers are in a condition in which reactions are occurring, and wherein said storage chamber is used as a holding chamber for temporarily holding said deuterium containing gas inside each reactor chamber that is in a condition in which reactions are not occurring.

* * * * *